United States Patent
Allison et al.

(10) Patent No.: US 6,549,960 B1
(45) Date of Patent: Apr. 15, 2003

(54) ARCHITECTURE AND APPARATUS FOR IMPLEMENTING 100 MBPS AND GBPS ETHERNET ADDRESS

(75) Inventors: Samuel Steven Allison, Fuquay-Varina, NC (US); Kenneth James Barker, Cary, NC (US); Joseph Kinman Lee, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/714,643

(22) Filed: Nov. 16, 2000

Related U.S. Application Data

(62) Division of application No. 09/114,761, filed on Jul. 13, 1998.

(51) Int. Cl.[7] .......................... G06F 13/00; G06F 13/14
(52) U.S. Cl. .............................. 710/29; 710/33; 710/35; 710/36; 709/223; 709/224
(58) Field of Search ............................. 710/29, 33, 35, 710/36; 709/223, 224

(56) References Cited

U.S. PATENT DOCUMENTS

| | | | |
|---|---|---|---|
| 4,403,303 A | 9/1983 | Howes et al. | 364/900 |
| 5,438,614 A | 8/1995 | Rozman | 379/93 |
| 5,513,376 A | 4/1996 | Lohmeyer | 710/53 |
| 5,560,038 A | 9/1996 | Haddock | 395/800 |
| 5,604,867 A | 2/1997 | Harwood | 395/200.13 |
| 5,659,758 A | 8/1997 | Gentry et al. | 395/733 |
| 5,659,794 A | 8/1997 | Caldarale et al. | 395/821 |
| 5,671,355 A | 9/1997 | Collins | 709/200 |
| 5,689,726 A | 11/1997 | Lin | 395/830 |
| 5,764,896 A | 6/1998 | Johnson | 709/200 |
| 5,794,072 A * | 8/1998 | Nomura et al. | 395/860 |
| 5,903,724 A | 5/1999 | Takamoto et al. | 395/200.3 |
| 5,905,874 A | 5/1999 | Johnson | 709/200 |
| 5,912,888 A | 6/1999 | Walsh et al. | 370/355 |
| 5,995,147 A * | 11/1999 | Suzuki | 348/385 |
| 6,170,022 B1 * | 1/2001 | Linville et al. | 710/29 |
| 6,172,984 B1 * | 1/2001 | Beyda et al. | 370/448 |
| 6,205,150 B1 * | 3/2001 | Ruszczyk | 370/412 |
| 6,222,825 B1 * | 4/2001 | Mangin et al. | 370/235 |

FOREIGN PATENT DOCUMENTS

| | | | |
|---|---|---|---|
| JP | 9083606 | 3/1997 | H04L/29/08 |
| WO | 97/15123 | 4/1997 | H04B/3/00 |
| WO | 97/33408 | 9/1997 | H04L/12/40 |

OTHER PUBLICATIONS

IBM Technical Disclosure Bulletin, V38, No. 8, Aug. 1995 "Method of Flow Control for 100–Mbps Ethernet Adapters".
IBM Technical Disclosure Bulletin, V37, No. 04A, Apr. 1994 "Interleaved Dual–Port VRAM for High–Speed Communication".
IBM Technical Disclosure Bulletin, V38, No. 07, Jul. 1995 "Recovery Method for Damaged Firmware".
IBM Technical Disclosure Bulletin, V37, No. 10, Oct. 1994 "Adapter Microcode Protection during Download".
IBM Technical Disclosure Bulletin, V40, No. 10, Oct. 1997 "Gigabit Speed Multi–Protocol Chip and Adapters for Network Computing".

* cited by examiner

*Primary Examiner*—Jeffrey Gaffin
*Assistant Examiner*—Rehana Perveen
(74) *Attorney, Agent, or Firm*—Joscelyn G. Cockburn

(57) ABSTRACT

An architecture and NIC (Network Interface Card) for coupling Data Processing Equipment to a communications network includes a host memory having a High Priority Queue storing control information and data, a Low Priority Queue storing control information and data. Control registers, in the NIC, store addresses identifying the location of said Queues and a block size register, in the NIC, stores a value representing the size of data blocks to be transferred from the host memory to the NIC. A controller transfers allowable block size data from the host memory to buffers on said NIC.

7 Claims, 17 Drawing Sheets

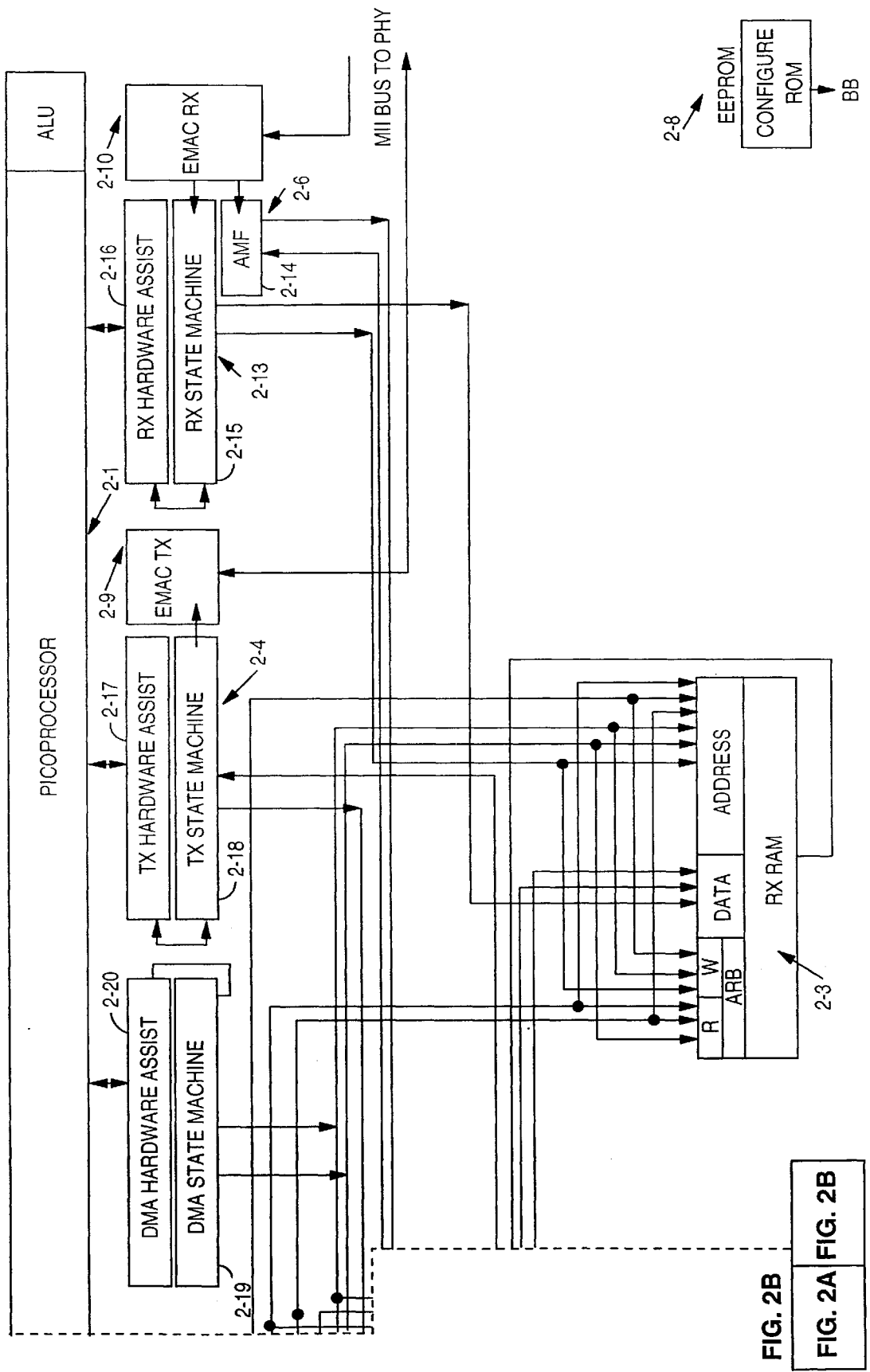

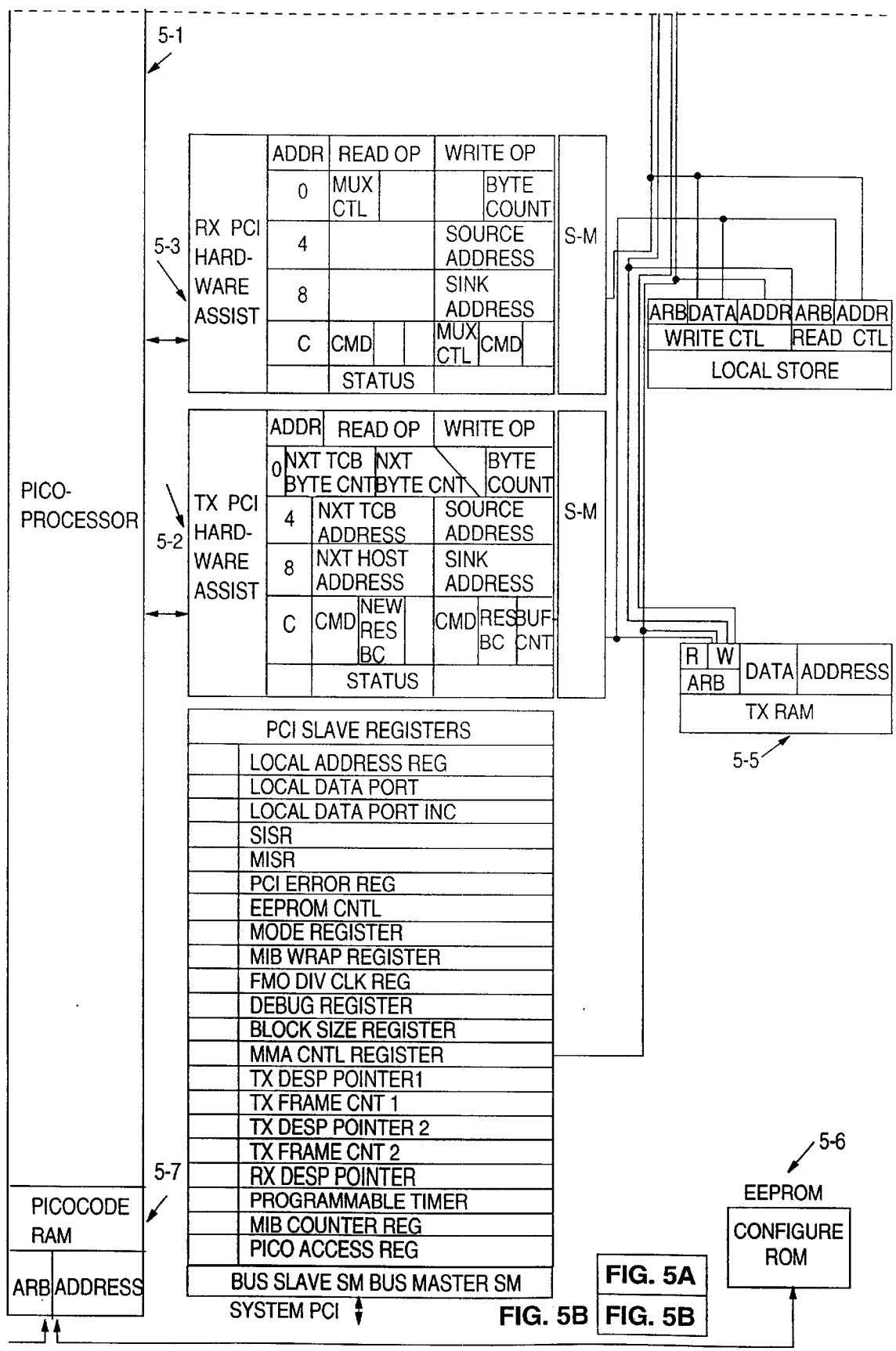

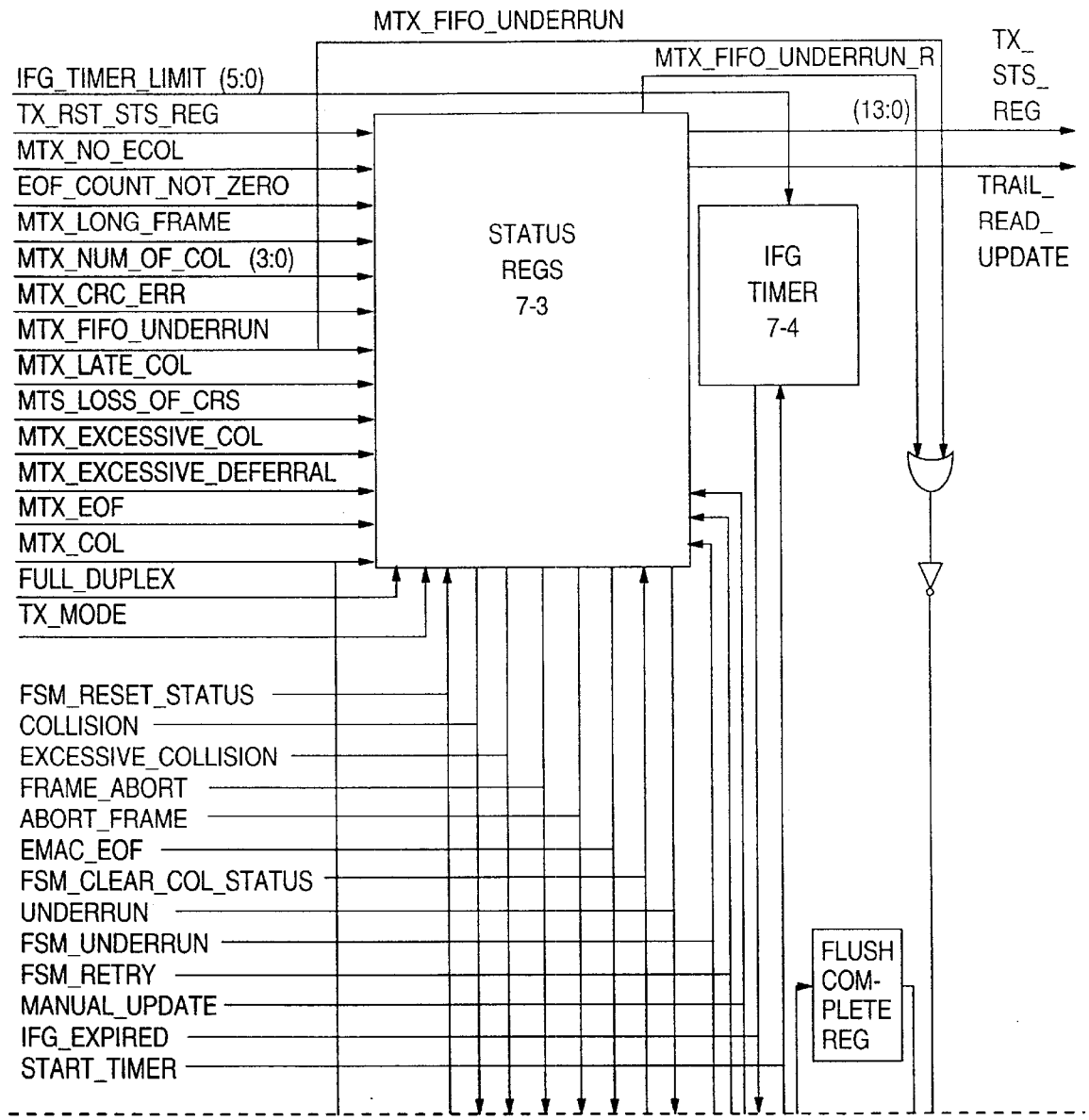

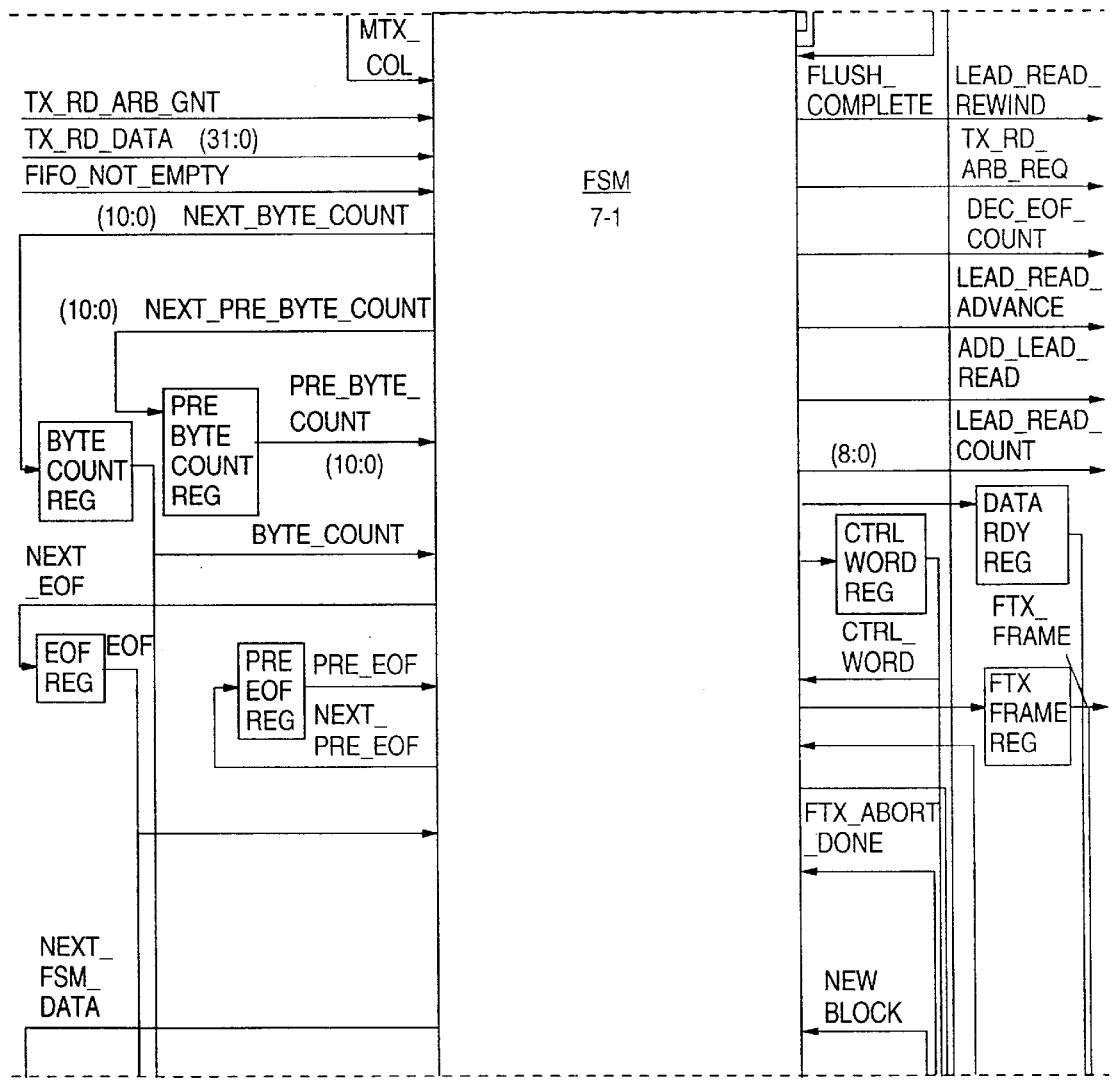
| FIG. 7A |
| FIG. 7B | FIG. 7B
| FIG. 7C |

| 31 | 30 | 29 ... 11 | 10 ... 0 |
|---|---|---|---|
| EOF | SOF | RESERVED | BYTE COUNT |

FIG. 9

| 31 | 30 | 29 | 28　　　　　　　　　16 | 15　　　　　10 | 9　　　　　0 |
|---|---|---|---|---|---|
| EOF | SOF | 0 | RX DESC STATUS BITS 12:0 | HASH INDEX | BYTE COUNT |

FIG. 13

ARCHITECTURE AND APPARATUS FOR IMPLEMENTING 100 MBPS AND GBPS ETHERNET ADDRESS

CROSS REFERENCES TO RELATED PATENT APPLICATION

This patent application is a Divisional of patent application Ser. No. 09/114,761, filed Jul. 13, 1998.

BACKGROUND OF THE INVENTION

1. Field of the Invention

The present invention relates generally to communications networks and more particularly to Local Area Networks (LANs) or similar networks using ethernet and/or CSMA/CD (Carrier Sense Multiple Access with Collision Detect) protocols.

2. Prior Art

Ethernet and IEEE 802.3 LANs, among others, have become increasingly popular as the network of choice for interconnecting electrical machines such as computers, word processors, servers, switches, etc. Both the ethernet and IEEE 802.3 LANs are collision type networks in which a single and/or plural stations are connected to a common media. Access to the common media is controlled by the protocol.

Broadly speaking, any station may be analyzed in terms of the ISO model. This model has eight layers, with the media and structure for coupling the device to the media being classified in the two lower layers (i.e., Physical [PHY] and LLC) of the eight layer model. The other six layers are used to describe the device. The structure used to couple devices to the media is referred to as Network Interface Card (NIC) adapters or similar names. The protocols, such as ethernet and/or IEEE 802.3, for accessing the network, are provided in the NIC.

As the popularity of LANs grows, more and more demands are placed on them. The demands require improvement on old functions and providing new ones. One of the areas of demand for improved function is media speed. Historically, the standard speed for an ethernet LAN was 10 Mbps. However, ethernet has migrated from 10 Mbps to 100 Mbps and onto Gigabit ethernet (1000 Mbps). The demand for new function includes ACPI Power Management, IEEE 802.3X Flow Control, and Wake On LAN.

Several prior art references describe NICs for coupling devices to ethernet LANs. However, none of the references describe a comprehensive architecture, for a NIC, that provides both low and high speed data transmission and provide new functions. Examples of prior art include the following:

U.S. Pat. No. 5,311,509 describes a transmission system including a transmitter section, a switching module and a receiver section. The transmitter section transforms frames of user data in fixed ATM cells which are transported through the switching module and re-assembled into frames of user data by the receiver section.

U.S. Pat. No. 5,404,544 describes a Media Access Controller (MAC) for coupling devices to a 10 Base-T ethernet LAN. Usually, the 10 Base-T ethernet LAN is a relatively low speed (10 Mbps) network.

U.S. Pat. Nos. 5,412,782 and 5,485,584 describe a minimal latency adapter in which the adapter initiates an early interrupt for DMA transfer with the host prior to receiving a complete packet from the network. Data transfer from the network to the adapter overlap with data transfer from the adapter to the host.

U.S. Pat. No. 5,446,914 describes a coding and transceiving ethernet circuit that connects an external controller to twisted pair or coax cabling system.

U.S. Pat. No. 5,526,355 describes a modified ethernet protocol with short and long interpacket gaps (IPG). The station winning access to the media after a collision uses the short IPG between data packets. The losing station uses the long IPG before it attempts to gain access to the media. The use of the long and short IPGs is alternated between the stations.

U.S. Pat. No. 5,596,575 describes a 10 Mbps/100 Mbps adapter that automatically adjusts to the speed of the network.

U.S. Pat. No. 5,642,360 describes algorithms for adjusting Inter Frame Spacing (IFS) used by an ethernet controller to regulate data throughput.

SUMMARY OF THE INVENTION

It is an object of the present invention to provide the architecture for a NIC that supports data speeds of 10 Mbps, 100 Mbps and 1000 Mbps (Gigabits).

It is another object of the present invention to provide the architecture for a NIC that embraces new functions including ACPI (Advanced Configuration and Power Interface) Power Management, IEEE 802.3X Flow Control and Wake-On-LAN.

The NIC that embodies the architecture includes a Master and Slave host bus interface with block size control registers, a microprocessor controller, transmit (TX) storage, Local Storage, Receive (Rx) storage, ethernet MAC (EMAC) layer control hardware, and hardware assist logic coupling the microprocessor controller to the named structures. The block size for data is set in the block size control registers. The microprocessor controller uses the block size information and information stored in the host buffer descriptors to control the flow of data through the NIC. The efficiency of the NIC is further enhanced by the microprocessor initiating and causing several operations (discussed below) to be executed simultaneously.

Other features of the NIC include multiple queued transmit frames, control word per data block, programmable interframe gap timer, priority queues, Wake-On-LAN, debug interface, prefetch buffer descriptor for receive operation, hardware assists for building addresses, and microprocessor controller IPL from EEPROM.

These and other features of the present invention will be apparent from the following detailed description and accompanying drawings.

BRIEF DESCRIPTION OF THE DRAWINGS

FIGS. 2A and 2B show a more detailed block diagram of the NIC according to the teachings of the present invention. This figure is helpful in understanding data flow through the NIC.

FIGS. 5A and 5B show a block diagram of the Hardware Assists Logic and the microprocessor controller.

FIGS. 7A–7E show a block diagram for the Transmit (Tx) State Machine.

FIG. 9 shows a circuit diagram for the status Registers and control logic.

FIG. 13 shows a graphical representation for the Rx RAM Control Word Format.

DETAILED DESCRIPTION OF THE PREFERRED EMBODIMENT

Figure 1:
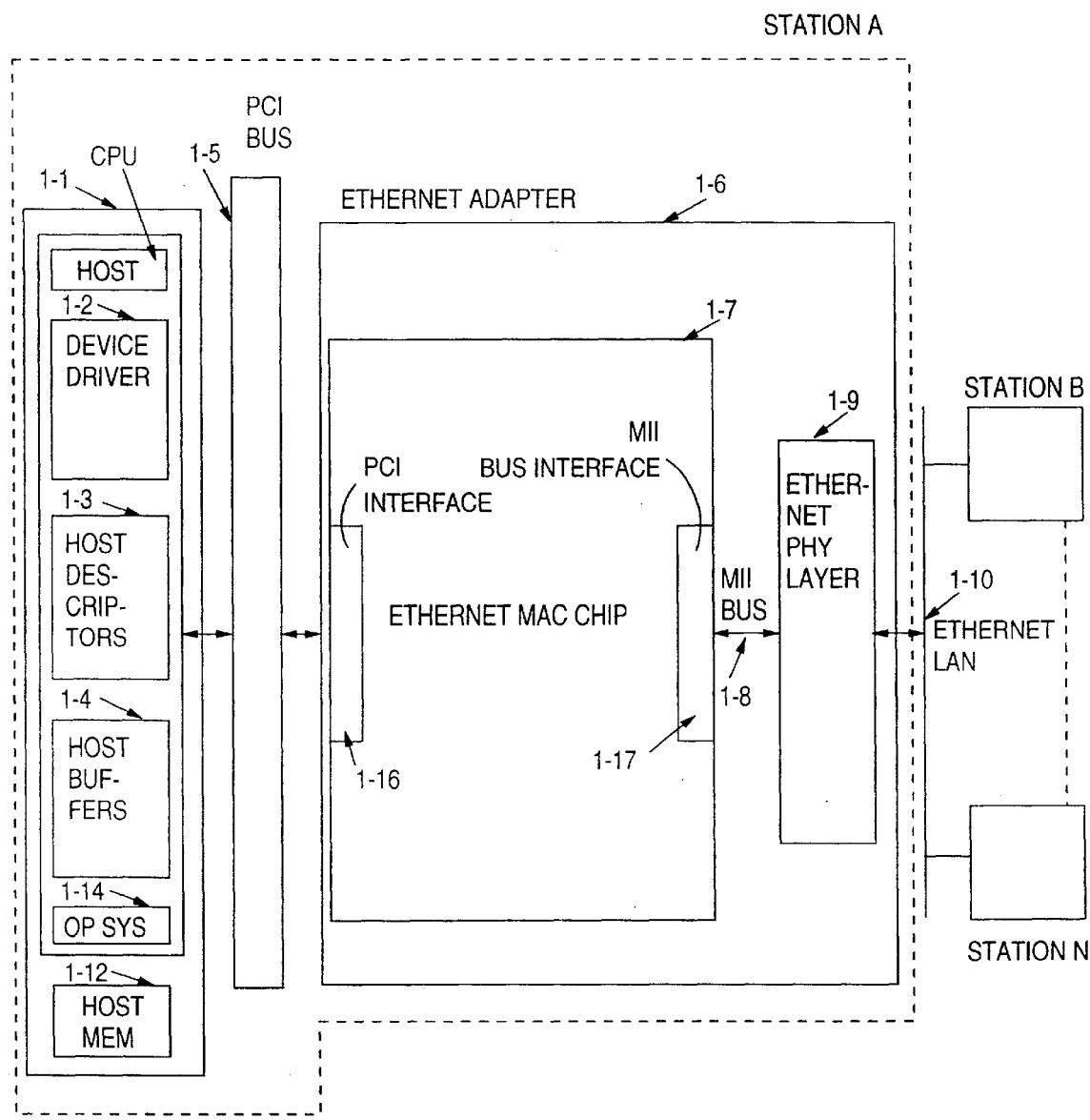
FIG. 1 shows a block diagram of the Network Interface Card (NIC) according to the teachings of the present invention.

FIG. 1 shows a block diagram of the communications network embodying the teachings of the present invention. The communications network includes a plurality of stations A through N connected to ethernet LAN 1-10. For purposes of describing the present invention, a block diagram of stations A is shown. Station A includes a host system or computer 1-1, PCI Bus 1-5, and ethernet adapter 1-6. The PCI Bus 1-5 connects the host system to the ethernet adapter 1-6 and the ethernet adapter connects the host and the PCI Bus to the ethernet LAN. The host can be any conventional computer or workstation. For purposes of discussion, the conventional devices such as keyboard, display terminal, etc. which are used by a user to communicate with the host is not shown in the figure. In general, the host system includes a CPU including an operating system (OP SYS) 1-14, host memory 1-12, host descriptors 1-3, and device driver 1-2. The PCI Bus is a standard bus for interconnecting host systems to peripheral devices. Details of the PCI Bus are set forth in PCI Local Bus Specification Revision 2.1 Production Version dated Jun. 1, 1995 and is incorporated herein by reference.

The ethernet adapter 1-6 (hereinafter referred to as ethernet NIC Network Interface Card) includes ethernet MAC (Medium Access Controller) chip, ethernet physical layer chip 1-9 and MII Bus 1-8. The MII Bus interconnects the ethernet MAC chip to the ethernet physical layer chip. The MII Bus is a standard interface that is used to connect an ethernet MAC to an ethernet physical chip. The MII is an IEEE standard interface that allows any ethernet MAC to connect one ethernet physical layer. The MII interface makes the MAC independent of the type of media connected to the physical layer chip. Likewise, the ethernet physical layer chip 1-9 is a standard chip that has the specialized analog and digital circuits necessary to interface with the type of media the network is made of. The media could include fiber, unshielded twisted pair (UTP), shielded twisted pair (STP), etc.

The ethernet MAC chip 1-7 includes PCI Bus interface 1-16 and MII Bus interface 1-17. The PCI Bus interface 1-16 includes the necessary circuits that allow the exchange of information between the ethernet MAC chip and the PCI Bus 1-5. Likewise, the MII Bus interface 1-17 includes the necessary circuits that allow exchange of information between the MII Bus and the ethernet MAC chip 1-7.

Figure 2A:
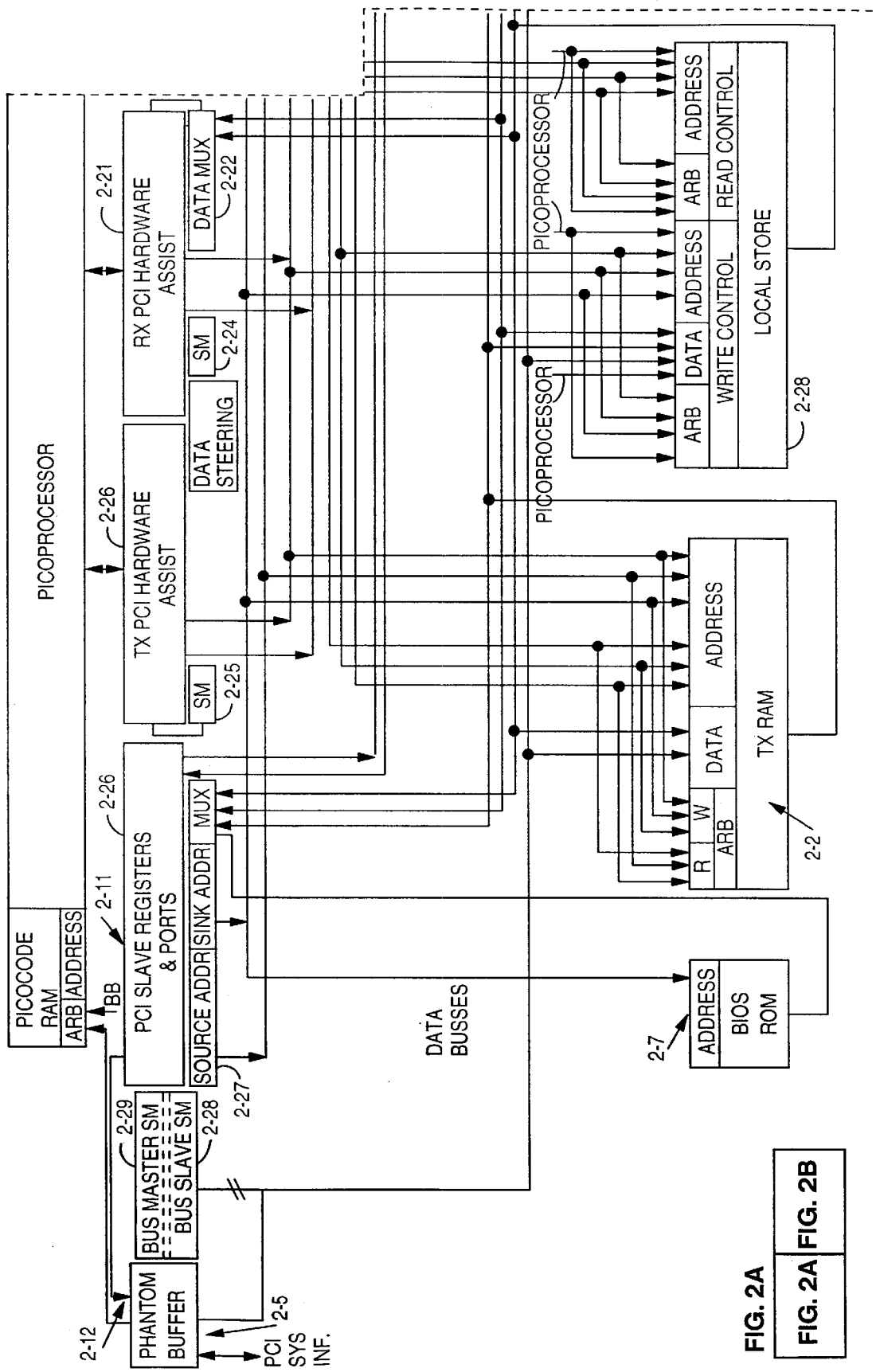

FIG. 2 shows a block diagram of the ethernet MAC chip 1-7 according to the teachings of the present invention. The MAC chip and its architecture is such that data is moved across the adapter at media speeds that could be 10 Mbps or 100 Mbps or Gigabit. In particular, data is moved from the memory of the host system to the adapter, from the adapter to the host memory, and from the adapter to the ethernet media (and from media to adapter). The ethernet MAC chip includes Phantom Buffer 2-12, Bus Slave State Machine (SM) 2-28, Bus Master State Machine (SM) 2-29, PCI Slave Register and Ports 2-26, Transmit (Tx) PCI Hardware Assist 2-26, State Machine (SM) 2-25, Receive (Rx) PCI Hardware Assist 2-21, State Machine (SM) 2-24, Data MUX 2-22, DMA (direct memory access) Hardware Assist 2-20, DMA State Machine 2-19, Transmit (Tx) Hardware Assist 2-17, Tx State Machine 2-18, EMAC Tx 2-9, Receive (Rx) Hardware Assist 2-16, AMF (Address Match Function) 2-14, EMAC Rx 2-10, Tx RAM 2-2, Local Store 2-28, Rx RAM 2-3, BIOS ROM 2-7, EEPROM 2-8 and Picoprocessor 2-1.

The named components are interconnected as shown in the figure. The interconnection also shows the direction in which data and control information are moved between the named components. The EEPROM 2-8 stores configuration information which is loaded through conductor BB into the Picoprocessor arbitration (ARB) section. The EEPROM 2-8 can also store information which is used to initialize the PCI Bus. The BIOS ROM 2-7 carries code which can be loaded remotely into the host system connected to the EMAC. The code which is loaded from the BIOS ROM is usually device driver code.

Still referring to FIG. 2, the adapter can operate in either a slave mode or a bus master mode. When operating in the slave mode, the host system is in control and the communication between the slave (i.e., the adapter) is effectuated by the bus slave SM 2-28 and the PCI slave register and port 2-26. The block labeled 2-27 indicates information which can be extracted from the PCI slave register and port (details to be given below). The information extracted from PCI Slave and Slave Register and Ports 2-11 can be a source address (Source Addr) which is used to access Tx RAM 2-2, Local Store 2-28 and Rx RAM 2-3. As will be explained in more detail below, the Tx RAM stores information received from the host to be transmitted onto the ethernet media. To access the Tx RAM, several different components in the figure present an address on the lines shown with respective arrows going into the address portion of the Tx RAM. The components may read or write the RAM through the arbitrator (ARB). A table showing the actions (i.e., Read or Write) that can be taken relative to the Tx RAM, the Local Store or Rx RAM are recorded on the top portion. To read the RAMs or Local Store requires an address. To write the RAMs or Local Store requires an address and data. The information from the RAMs or Local Store are placed on the conductor exiting from the bottom portion of the RAM.

Still referring to FIG. 2, if a sink or destination address is extracted from the PCI slave register, the components which are addressed are the BIOS ROM, Tx RAM, Local Store, or Rx RAM. The EMAC Tx and EMAC Rx are part of the Mil interface 1-17 (FIG. 1). The EMAC Tx function receives data from the Tx State Machines and transfers it to the Mil Bus; whereas, the EMAC Rx receives data from the MII Bus and with help from the Rx State Machine inserts the data in the Rx RAM. The Picoprocessor 2-1 is the main controller which manages the movement of data throughout the adapter.

If the adapter is operating in the master mode, it has full access to the host memory and effectuates its operation through the Bus Master State Machine. The Picoprocessor 2-1 manages the host descriptors 1-3 and buffers 14; moves data between the host buffers 14 and Tx RAM 2-2 and Rx RAM 2-3; initiates transmit with the Tx state machine 24;

posts status for transmit and receives; and initiates interrupts on the PCI Bus 1-5 (FIG. 1) for transmit and receive completion. Turning to FIG. 1 for the moment, the host descriptors 1-3 includes transmit buffer descriptors and receive buffer descriptors.

Figure 3:
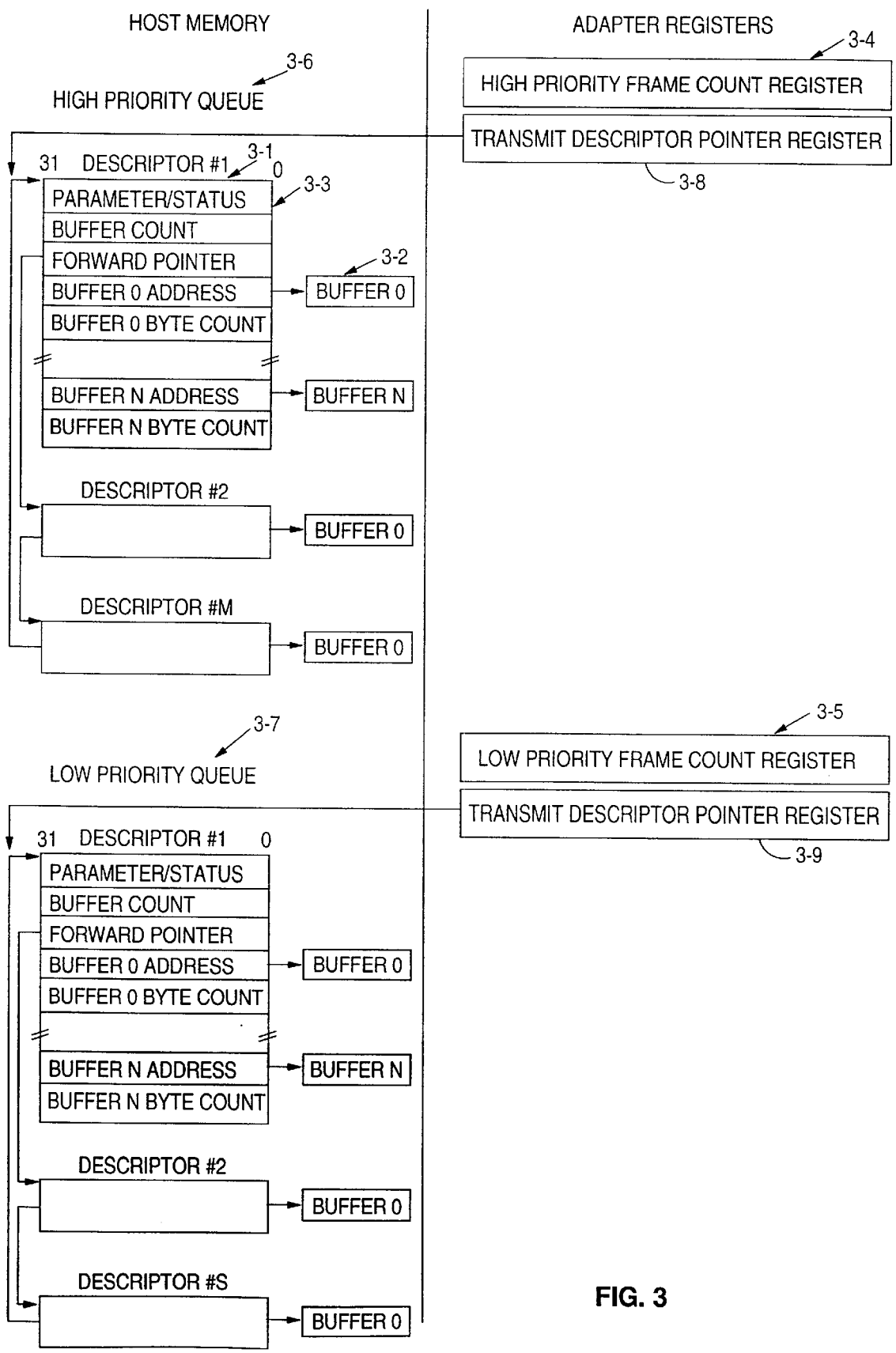
FIG. 3 shows the Transmit Buffer Descriptor Structure and associated control registers in the NIC.

FIG. 3 shows the structure for the transmit buffer descriptors in the Host Memory and related registers on the NIC or Adapter. It should be noted that NIC and adapter are used interchangeably. The vertical line from top to bottom of the page represents the interface between the host system and the ethernet adapter. The ethernet adapter on the right side of the line includes a plurality of control registers. Register 3-4 is a high priority frame count register and stores information about the number of frames which the adapter will transmit from the host memory. In other words, the value in High Priority Frame Count Register 3-4 indicates the number of frames which are queued for transmission in the host memory. The information on the queue is provided by the device driver. The Transmit Descriptor Pointer Register 3-8 is located within the adapter and contains the address whereat the first descriptor is located in the host memory. Likewise, the Low Priority Frame Counter Register 3-5 contains the number of frames which are queued on the Low Priority Queue 3-7 for transmission by the adapter under the control of the Picoprocessor. The Transmit Descriptor Pointer Register 3-9 carries the address whereat the first descriptor in the Low Priority Queue is stored. The pointer registers, for the High Priority Queue and the Low Priority Queue, are set by the device driver when the adapter is initialized. Likewise, the frame count registers are updated by the device driver as frames are queued for transmission.

Still referring to FIG. 3, the host memory is organized with a High Priority Queue 3-6 and Low Priority Queue 3-7. According to the teachings of the present invention, high priority information such as pause frame (set forth in 802.3X IEEE standard), etc., are placed on the High Priority Queue; whereas, low priority information are placed on the Low Priority Queue. The management of these queues are carried out by the device driver. The High Priority Queue includes a plurality of buffers 0 through n and a 32 bit wide descriptor associated with the buffers. The descriptors are numbered 1 through n, for the High Priority Queue and the buffers are numbered 0 through n for each of the descriptors. It should also be noted that descriptor #1, #2, and #m are identical. Therefore, the description of the descriptor # (number) 1 is applicable to each of the other descriptors. The descriptors number 1 through n and the associated buffers carry control information and data to be used in different ethernet frames. For example, Descriptor #1 and Buffers 0–n carry data and control information for a frame. Likewise, Descriptor #2 and associated buffer carry control information and data for another frame and so forth.

Still referring to FIG. 3, each of the Descriptors include Parameters/Status field in which the device driver sets a bit when the Picoprocessor is to move data from the Host Memory. The Picoprocessor inserts status information when it is completed. The Buffer Count field carries information indicating the number of buffers that the data is stored in. The Forward Pointer field indicates the address whereat Descriptor #2 is located in the memory. The Buffer 0 Address field carries the address for the first buffer in which data is stored. The Buffer 0 Byte Count field carries the number of bytes for Buffer 0. If there are other buffers associated with Descriptor #1, the number of byte counts in each buffer and each address are indicated in the section following the Buffer 0 Byte Count. The Buffer n Address field carries the address for the end buffer and Buffer N Byte Count carries the number of bytes in the $n^{th}$ buffer.

In operation, the Picoprocessor on the Adapter would access the location identified by the address in the Transmit Descriptor Pointer Register. If the Forward Pointer indicates that the information is continued, then the Picoprocessor continues processing at the address for Descriptor #2. If Descriptor #2 includes a forwarding address, the system goes to descriptor m, and at the conclusion, descriptor m points back to descriptor 1. Thus, the Descriptors are arranged in a round-robin fashion where Descriptor #1 points to Descriptor #2, Descriptor #2 to Descriptor m and m back to Descriptor #1. The structure of the Low Priority Queue 3-7 and its operation are identical to the High Priority Queue 3-6 set forth above. Therefore, a detailed description of Low Priority Queue 3-7 would only be repeating already given information and will not be given.

Figure 4:
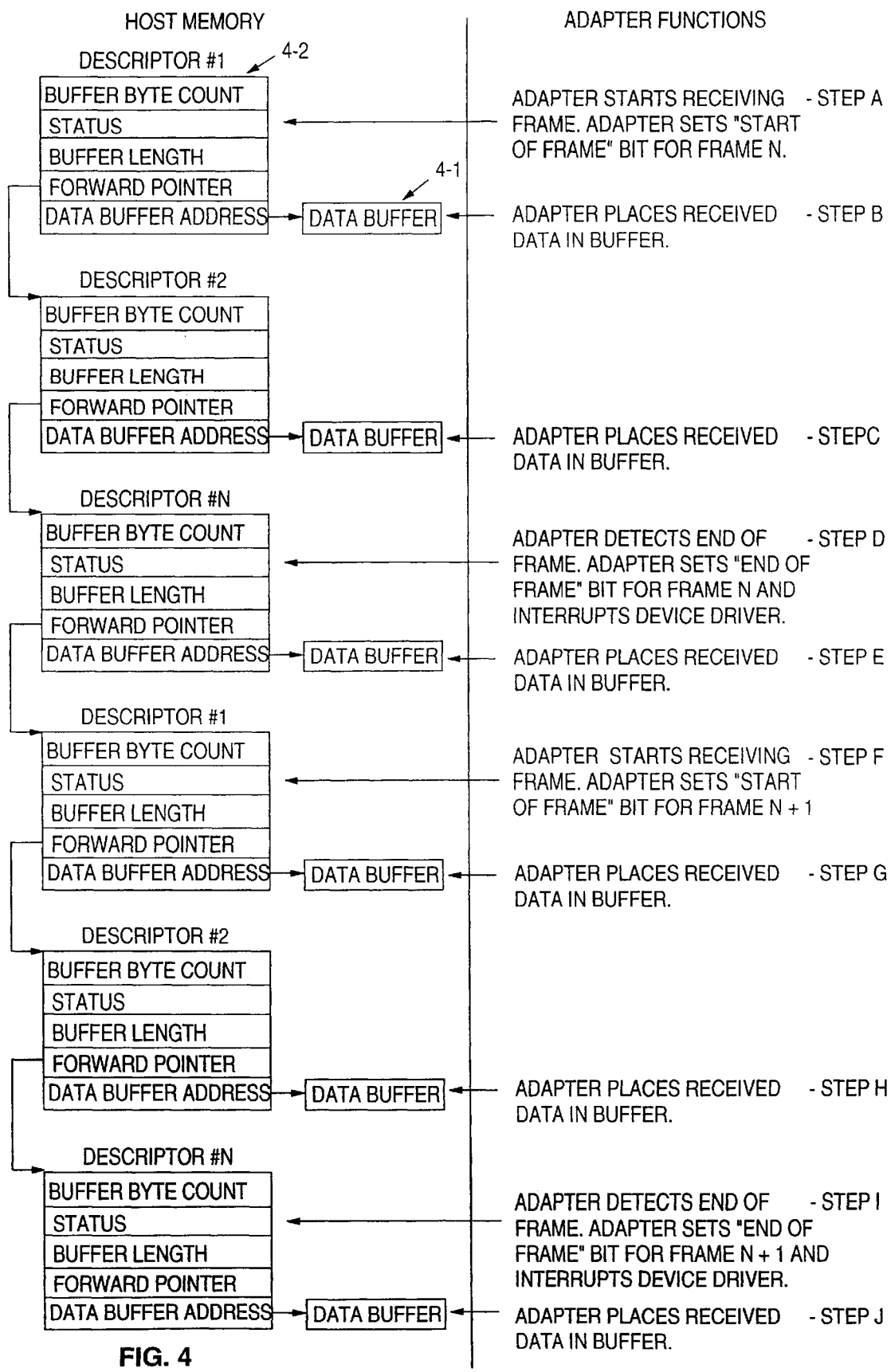
FIG. 4 shows the Receive Buffer Descriptor Structure and associated NIC functions.

FIG. 4 shows the Receive Buffer Descriptor structure and the functions performed by the Adapter in order to move receive frame from the adapter to the host memory. The host memory includes a Buffer Pool 4-1 with a plurality of buffers therein. Each buffer in the pool is associated with a descriptor. The pool of Descriptors are identified by numeral 4-2. As is shown in the figure, the structure of each Descriptor is identical, therefore, only one will be described. Each of the descriptors includes a Buffer Byte Count field in which a value for the number of bytes in the buffer is recorded. The Status field is written by the adapter and carries information relative to what section of the frame is placed in the buffer. The Buffer Length field carries information about the size of the buffer. The Forward Pointer field carries information regarding the location of the next Descriptor. The Data Buffer Address field carries information for the location of the buffer within the memory.

Each of the functions performed by the adapter is identified by an alphabetical step. This being the case, in step A, the adapter starts receiving a frame and sets a bit indicating start of frame in the status field of Descriptor #1. In step B, the adapter places the received data in the buffer. The Forward Pointer in Descriptor #1 points to Descriptor #2. The adapter continues to receive data for frame n and places it in the data buffer associated with Descriptor #2 (step C). Descriptor #2 points to the location in the memory for Descriptor #n. The adapter, on detecting the end of frame (step D), sets a bit in the status field for frame n and interrupts the device driver. The adapter then places the data in the data buffer associated with descriptor n and the data for frame n is written in the host memory.

Still referring to FIG. 4, the process for loading frame n+1 in the host memory is described by steps F through J. The representation in FIG. 4 is self-explanatory and further detailed description is not warranted.

Figure 5B:
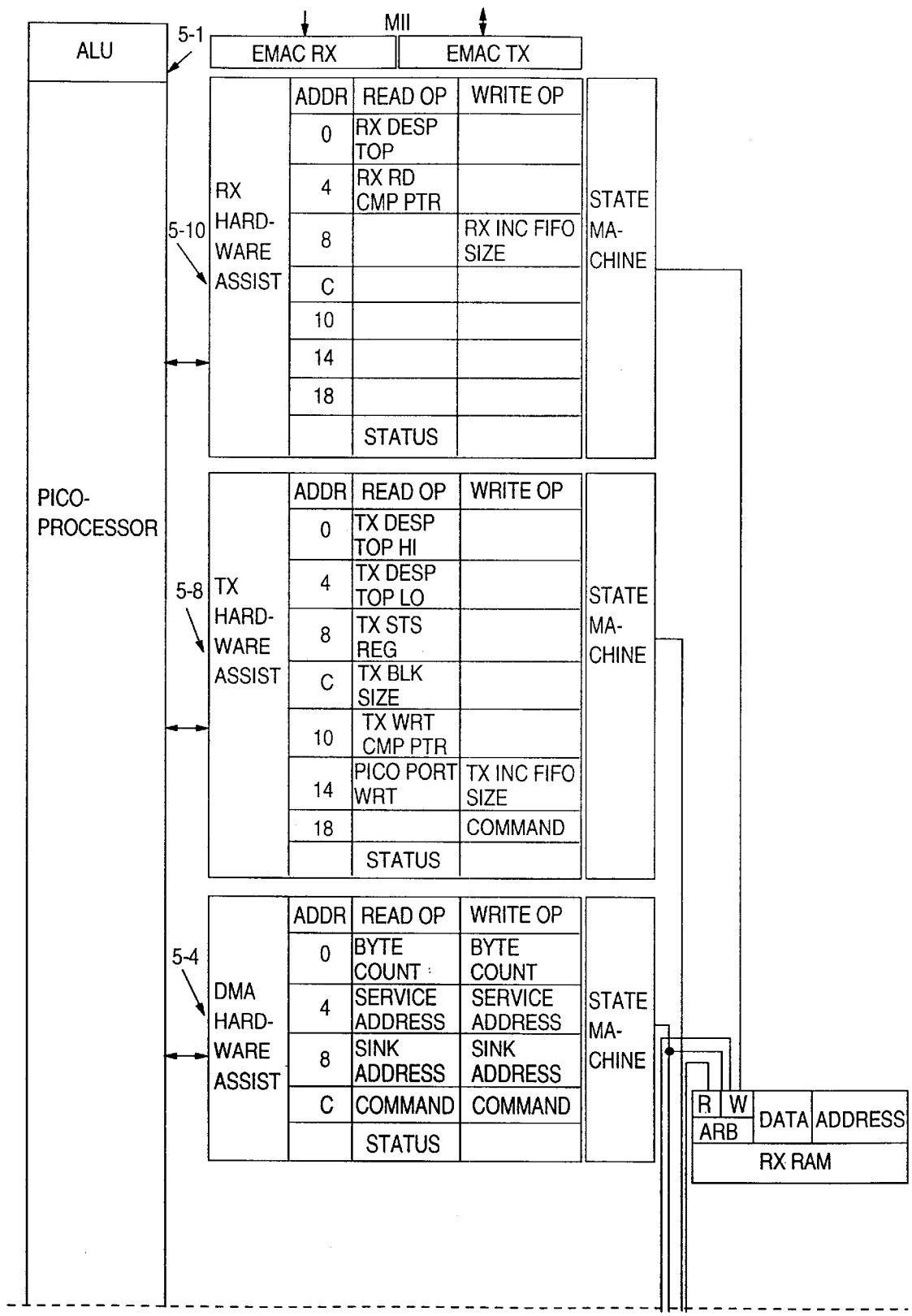

FIG. 5 shows a block diagram of the Picoprocessor and hardware assist logic. The Picoprocessor and hardware assist logic provide the management and control that enables data to be transported at media speed across the adapter. The Picoprocessor is coupled to a group of hardware assist logic including Tx PCI Hardware Assist 5-2, Rx PCI Hardware Assist 5-3, DMA Hardware Assist 5-4, Tx Hardware Assist 5-8, and Rx Hardware Assist 5-10. The respective ones of the hardware assist logic are coupled to the Tx RAM, Local Store, and Rx RAM. The interconnection between the respective ones of the hardware logic and the Tx RAM, Local Store or Rx RAM indicate which of the hardware logic can access the RAM or Local Store. By way of example, Tx PCI Hardware Assist 5-2 can access the Tx RAM and Local Store. The Rx PCI Hardware Assist 5-3 can access the Rx RAM, and so forth. Also shown in the FIG. 5 is the Bus Slave State Machine and Bus Master State Machine connected to the system PCI Bus. The PCI slave registers are also identified. On the MII Interface side of FIG. 5, the EMAC Rx which receives information from the MII Interface and EMAC Tx which transmits and receives information from the MII Interface are also shown.

Still referring to FIG. 5, the Picoprocessor includes arithmetic and logic unit (ALU) 5-1 and Picocode RAM 5-7. An arbitrator (ARB) provides access to the various devices which may seek entry into the Picocode RAM at the stated address. The Picoprocessor is a limited function processor and uses the respective hardware assist logic to expands its instruction set and performance. The hardware assist logic is aided by the associated state machines to carry out commands dictated by the Picoprocessor. By way of example, the Tx PCI Hardware Assist logic 5-2 has access to the Tx RAM. The Tx (Transmit) RAM buffers information to be transferred to the LAN. The Rx PCI Hardware Assist logic 5-3 has access to the Rx RAM and so forth. The Rx (Receive) RAM buffers information received from the LAN. In summary, the connection between the respective hardware assist and the Tx RAM, Local Store and Rx RAM indicate which hardware assist can access which storage.

Still referring to FIG. 5, each of the hardware assist comprises a plurality of registers. Since the structure of each of the hardware assist are substantially similar, only one, such as PCI Hardware Assist 5-3, will be described. It being understood that the description for 5-3 can be extended to other hardware assist. As stated, the hardware assist includes a plurality of registers. Each register has an address, a read operation and a write operation. With respect to the Rx PCI Hardware Assist 5-3, the address of the registers are shown as 0, 4, 8 and C. It should be understood that there is no limitation on the number of registers used. In this particular example, only four registers are used and are identified in the column labelled Addr (address). Next to the address column is a Read OP column. In the Read OP column, the Picoprocessor can only read the information identified in the associated register. For example, in the PCI Hardware Assist 5-3, the Picoprocessor may read the MUX control register 0, the CMD (command) register C. The status after the work is done is written by the state machine in the section of the register labelled status under the Read Operation. The Picoprocessor may also write the information identified under the Write OP column. Consequently, the Picoprocessor may write Byte Count (Register 0), Source Address (Register 4), Sink Address (Register 8) and so forth.

In summary, the Picoprocessor can read register or write to register and then wait for the associated state machine to carry out the command. The status of the command is reported in the Read Operation section of the register labelled STATUS.

The PCI slave registers are also identified in FIG. 5. The PCI Slave Registers, together with the Bus Slave State Machine, provide the slave management circuit arrangement when the adapter is running in the slave mode. To this end, most of the registers in the PCI Slave Registers Listing are written by the Device Driver in the host system. Some of the entries in the listing are ports from which information is obtained. The output from the PCI registers can access the Tx RAM, the Local Store or the Rx RAM. The interconnection between the named components indicate the direction of data flow from the PCI Slave Registers and ports. It should be noted that the Local Store primarily contains information for the Picoprocessor. The Bus Master State Machine and the Picoprocessor and associated hardware assist control when the adapter is running in the master mode. In summary, the hardware assist logic described above extends the instruction set of the Picoprocessor. The extensions reduce the code path lengths in the Picoprocessor and, hence, increase the performance of the adapter. The hardware assist also provides ALU (5-1) functions. The functions provided by the Hardware Assists can run in parallel and are started at various points in the transmit and receive processes by the Picoprocessor. When the Picoprocessor requires the result of the hardware assist, then it will check the hardware assist status to see if the results are valid. Assuming the hardware assist has not completed its task, the Picoprocessor (2-1) will wait until the assigned task is completed.

Figure 7C:
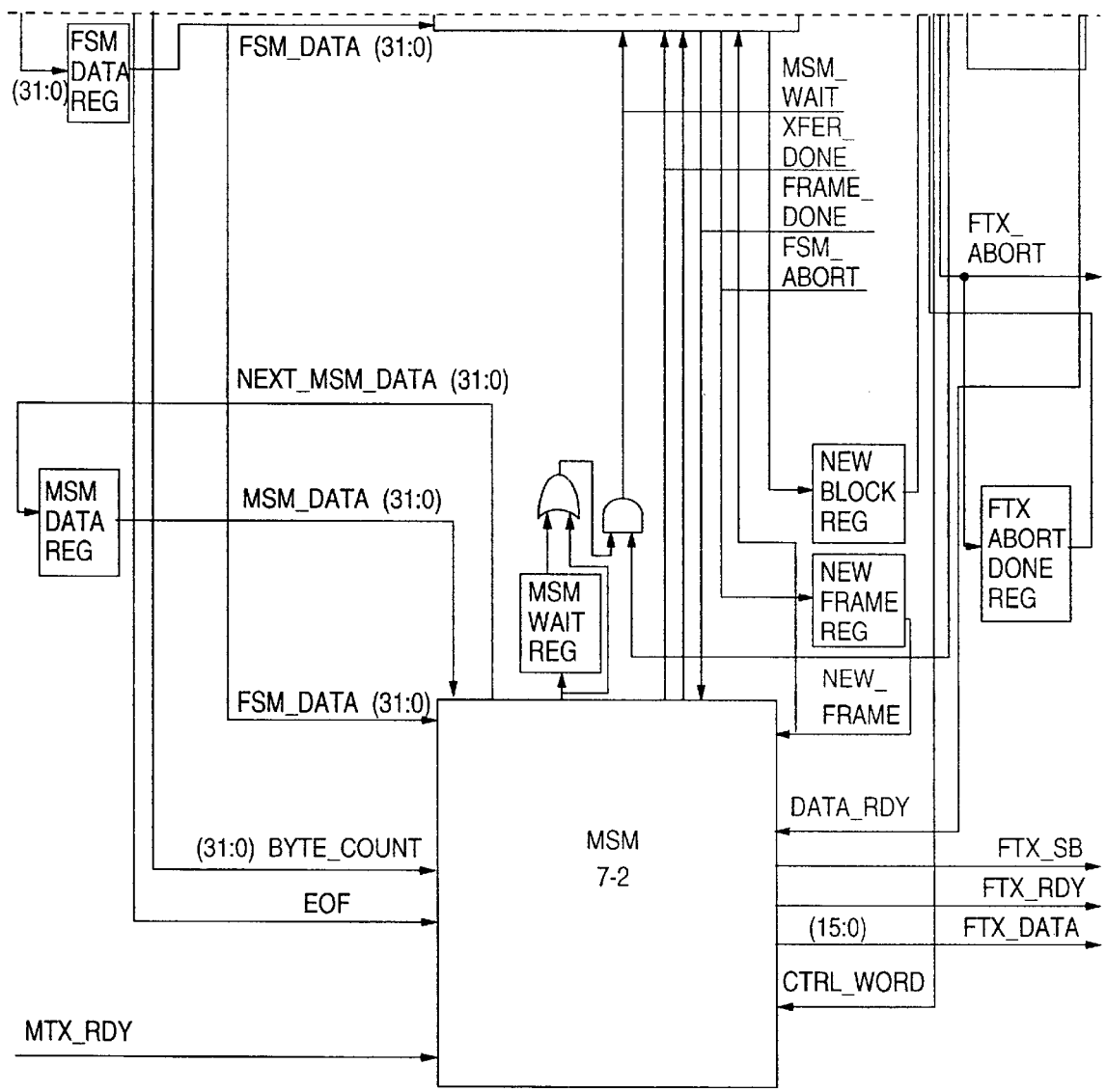
Figure 8:
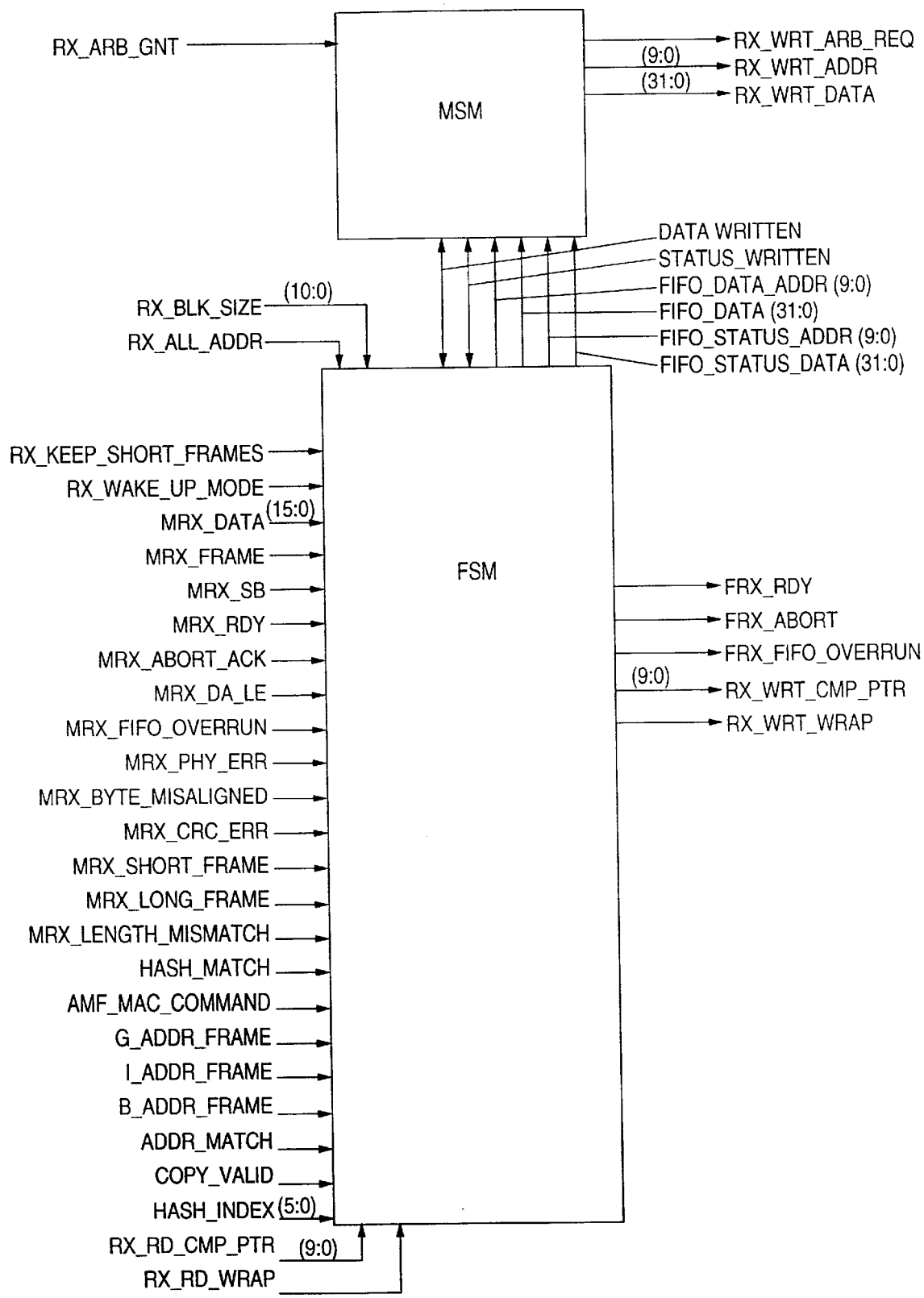
FIG. 8 shows a graphical representation for Tx RAM Control Word Format.

FIG. 7 shows a block diagram for the Tx (Transmit) State Machine. The transmit state machine includes FIFO State Machine (FSM) 7-1 and MAC State Machine (MSM) 7-2. As shown in FIG. 2, the Tx state machine interfaces with the ethernet MAC logic, transmit portion (EMAC Tx) for transferring data from the transmit RAM to the EMAC Tx for transmission on the media. The FSM 7-1 is responsible for reading data out of the Tx RAM and passing it to MSM 7-2, as well as handling the frame control signal interface to EMAC Tx. MSM 7-2 is responsible for passing the frame data to EMAC Tx when it is requested. The Tx state machine also contains status registers 7-3 and the programmable interframe gap (IFG) timer 7-4. The programmable IFG timer sets the time that must elapse before back to back frames can be transmitted on the media. The control signals in, between, and out of the Tx state machine are shown in the FIG. 7. The combinatorial logic and registers used in assisting the Tx State Machines are also shown. The interface between the Tx RAM and the EMAC Tx controls the transfer of data there between. The interface also controls aborting frames on the ethernet error conditions, and re-trying frames after Early Collision. There are twelve (12) input signals listed in table 1 below and five (5) output signals. The first 12 signals in the table identify the inputs and the last five signals identify the output.

TABLE I

| Name of Signals | Functions |
| --- | --- |
| Inputs: | |
| MTX_RDY: | Indicates EMAC is ready to transfer data. |
| MTX_EOF: | Indicates transmission on the media is complete. |
| MTX_FIFO_UNDERRUN: | Indicates that EMAC's internal buffer has underrun; MSM is not supplying data to EMAC fast enough. |
| MTX_LONG_FRAME: | The currently transmitting frame has exceeded the ethernet maximum length of 1518 bytes. |

TABLE I-continued

| Name of Signals | Functions |
|---|---|
| Inputs: | |
| MTX_LOSS_OF_CRS: | A loss of carrier sense was detected during transmission of the frame. |
| MTX_CRC_ERROR: | The CRC supplied with the frame (if automatic CRC generation is turned off in the CHIP TX Mode Reg) is incorrect. |
| MTX_NO_ECOL: | This signal is asserted once transmission of the frame has passed the 64-byte early collision window. |
| MTX_COL: | An early collision has occurred. |
| MTX_EXCESSIVE_COL: | 16 consecutive early collisions have occurred on the same frame. |
| MTX_LATE_COL: | A collision has occurred outside the 64 byte early collision window. |
| MTX_EXCESSIVE_DEFFERAL: | EMAC was unable to begin transmission of the frame within the ethernet deferral window. |
| MTX_NUM_OF COL: | 4 bit field indicating the cumulative number of early collisions for the current frame. |
| Outputs: | |
| FTX_FRAME: | This signal is asserted by Tx State Machine to indicate when a frame is being passed from Tx State Machine to EMAC. |
| FTX_RDY: | Indicates that Tx State Machine has data to transfer to EMAC. |
| FTX_DATA: | 16 bit data bus for data transfers from Tx State Machine to EMAC. |
| FTX_SB: | Used on last data transfer of the frame to indicate that only one byte of the two byte transfer is valid. |
| FTX_ABORT: | Indicates that Tx State Machine wants the current frame to be aborted. |

The Picoprocessor initiates the transmit process by transferring data into the Tx RAM. Of course, other types of storage devices can be used without deviating from the scope or spirit of the present invention. This is done via PCI Bus Master Read Operations. The data is organized in the Tx RAM via blocks. Each block begins on a word boundary and is preceded by a Block Control Word (details set forth hereinafter). The Block Control Words are placed into the Tx RAM by the Picoprocessor via the DMA State Machine. The control words are built by the Picoprocessor. All blocks must be of a multiple of two in length except the last block of a frame, which may be of any length. The Block Control Word contains bits that indicate if the block is for the start of frame (SOF) and/or end of frame (EOF), as well as the length of the data within the block.

Figure 9:
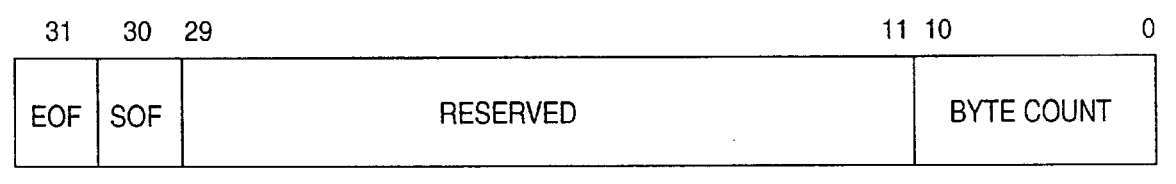

Turning to FIG. 9 for the moment, the Block Control Word format for the Tx RAM is shown. The word is 32 bits wide with bit 31 being the EOF (End of Frame) bit, bit 30 being the SOF (Start of Frame) bit, bits 29-11 are reserved, and bits 10 through 0 carry the Byte Count.

A listing of the Tx State Machine Operation follows:
1. Once the Picocode has moved the block of data into the Tx FIFO, it will increment the Write pointer in the FIFO Pointer Control logic (FPC). At this point the FPC will signal that the Tx FIFO is 'NOT EMPTY'.
2. The FIFO State Machine, FSM will see that the FIFO is NOT EMPTY, and will initiate the Tx Process by reading the Tx FIFO Control Word that is the current Read Address. At this point the Trailing Read and Leading Read addresses in the FPC will be the same.
3. FSM will check to see if the IFG Timer has expired (the IFG timer is kicked off upon completion of the previous frame). Then it will read the first data word and begin passing the data to the MAC State Machine (MSM). At this point FTX_FRAME signal will be asserted to indicate to EMAC that a new frame has begun.
4. The MSM will pass the data to EMAC two bytes at a time, using the FTX_RDY/MTX_RDY handshake. When all four bytes of the word have been transferred, the MSM will check to see if the FSM has retrieved the next word.
5. FSM will continue to retrieve data words, handshaking transfer of these words between it and the MSM via DATA_RDY/XFER_DONE signals.
6. Once 64 bytes of data has been transferred, EMAC will signal this fact via the
   MTX_NO_ECOL signal. At this point, FSM will assert Trail Read Update to the FPC if the EOF block has been written into the FIFO by the Picoprocessor. If the EOF block is not in the FIFO, Trail Read Update will not be asserted until the EOF block is present. When Trail Read Update is asserted, it will cause the Trail Read pointer to stay with the Lead Read pointer once the Early Collision Window has been exited and the EOF block is present.
7. If there is an Early Collision within the Early Collision Window, FSM will de-assert FTX_FRAME, and will assert Lead Read Rewind, telling the FPC to start back at the SOF, so FSM can retransmit the frame.
8. FSM will keep track of the byte count in the block. When the block is finished, it will retrieve the next FIFO Control Word until an EOF block has been reached. Once the EOF block has been exhausted, FTX_FRAME will be de-asserted.
9. MSM will have an indication when the EOF block is being processed. At the end of the block, if the block is an odd length, FTX_SB will be asserted to tell EMAC that only one byte of the two byte transfer is valid. MSM will signal to FSM that the last transfer of the frame has completed.
10. FSM will now wait for MTX_EOF from EMAC. Once it is received, the IFG Timer will be run again and the EOF block counter in the TCB HWA will be decremented. After MTX_EOF is received, FSM will again check the NOT EMPTY signal from the FPC to see if there is more data to transmit.

Referring to FIGS. 7 and 2, the mission of Tx State Machine is to be the main controller of the interface between the Tx RAM 2-2 and EMAC Tx 2-9. To this end, FSM 7-1, of the Tx State Machine, reads the data from the Tx RAM 2-2, interprets the block control words placed in the Tx RAM by the Picoprocessor, controls the frame start and ends with EMAC and handles any errors that occur during the transmission of the frame. The FSM 7-1 has five states listed in Table II below.

TABLE II

0. IDLE/READ DATA: In this state, FSM is either in idle waiting for data to transmit, or issues a read request to the Tx FIFO to read a word of data.
1. INTERPRET DATA: This is the main processing state in the FSM. In this state the FSM interprets whether the data read is a control word or data, and if control, whether the block is for EOF or not. This state waits for the IFG timer to expire if it is the first block of a frame, and controls the Lead and Trail Read pointers of the Tx FIFO.
2. ABORT FRAME: This state is called if a frame is to be aborted. Depending on whether the abort is initiated by FSM or EMAC, a FTX_ABORT may need to be issued.
3. ABORT FLUSH: This state is used to flush the remaining blocks of an aborted frame from the Tx FIFO.
4. WAIT FOR EOF: In this state, FSM has finished processing frame data from the FIFO, and is waiting for EMAC to indicate that the frame has completed transmission. Once EOF has been reached, the IFG timer is activated for the next transmit.

The mission of MSM 7-2 (FIG. 7), of the Tx State Machine, is simple. It handles the handshake between Tx State Machine and EMAC Tx for the transferral of transmit data between the Tx RAM and EMAC Tx. The MSM 7-2 has three states listed in Table III below.

TABLE III

0. IDLE/WAIT FOR DATA: In this state MSM is either in idle state between frames, or has finished transferring a word of data to EMAC and the next word has not yet been made available by the FSM.
1. TRANSFER BITS 31:16: In this state MSM transfers bits 31:16 of the data word to EMAC.
2. TRANSFER BITS 15:0: In this state, MSM transfers bits 15:0 of the data word to EMAC.

Figure 10:
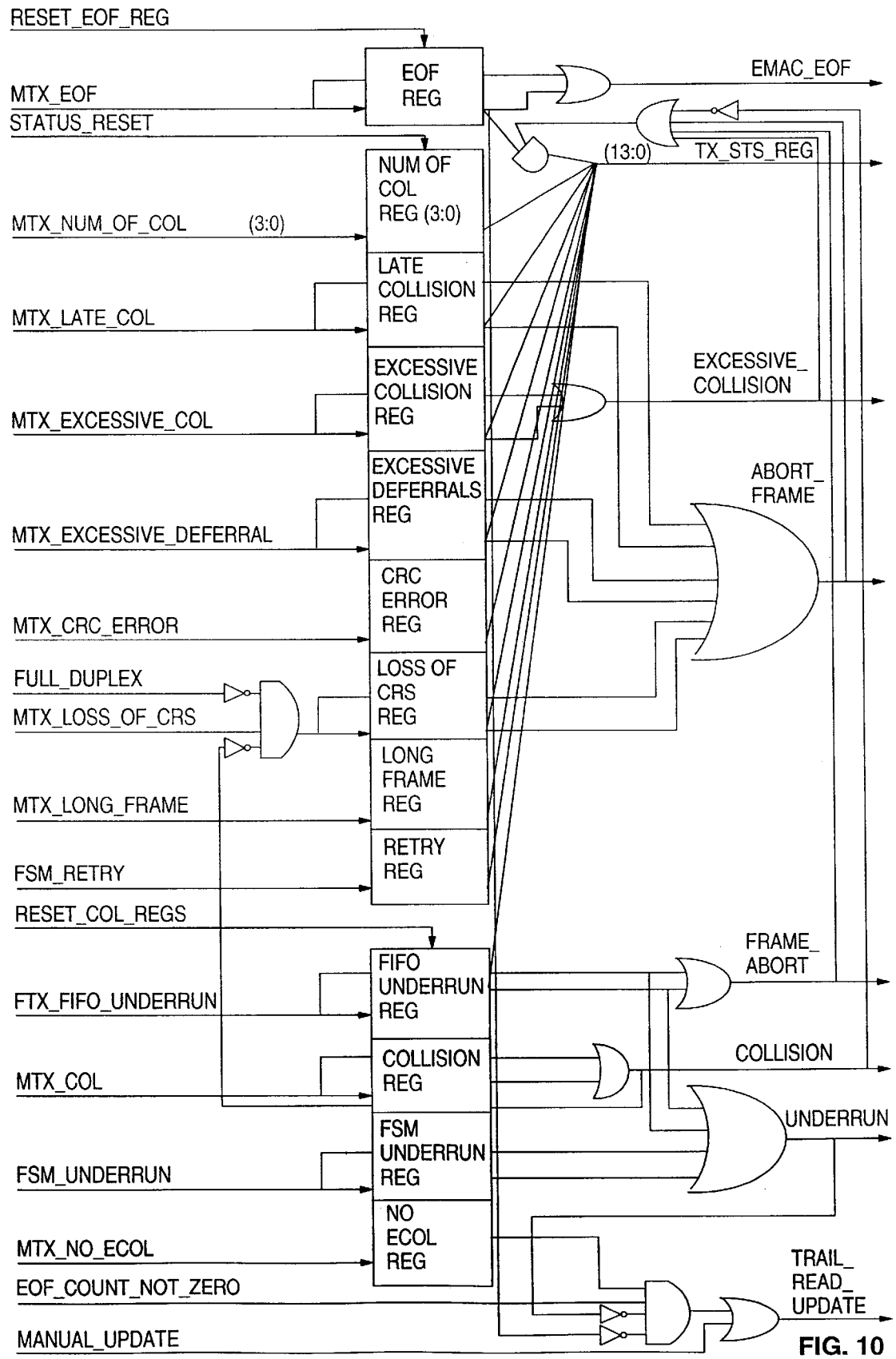
FIG. 10 shows a circuit diagram that generates Status Register Reset Signals.

FIG. 10 shows a circuit diagram for the status registers and combinatorial logic used to indicate the status of the currently transmitted frame. The output from the registers are concatenated onto the Tx_STS_Reg Bus. The bit ordering on this bus matches up with the bits as they appear in the Tx descriptor status field described above. The status registers interface with EMAC Tx (FIG. 2), the Picoprocessor (via Tx Hardware Assist and the FSM 7-1 [FIG. 7]). The interface with the EMAC Tx is just inputs of the EMAC status signals. The interface with the Picoprocessor is an input to reset the status, an input to reflect which mode the Picocode in the Picoprocessor is running in, and an output showing the current frame status. The interface with the FSM is an input to reset the status and output reflecting the current state of some status bits. The reset from the Picoprocessor and FSM work differently, depending on which mode the Picocode is running in. In mode 0, the Picocode will be the only one that can reset the status; so in this mode, the reset signal from the FSM will have no effect. In mode 1, the Picocode will not be resetting the status, only the FSM will.

Figure 11:
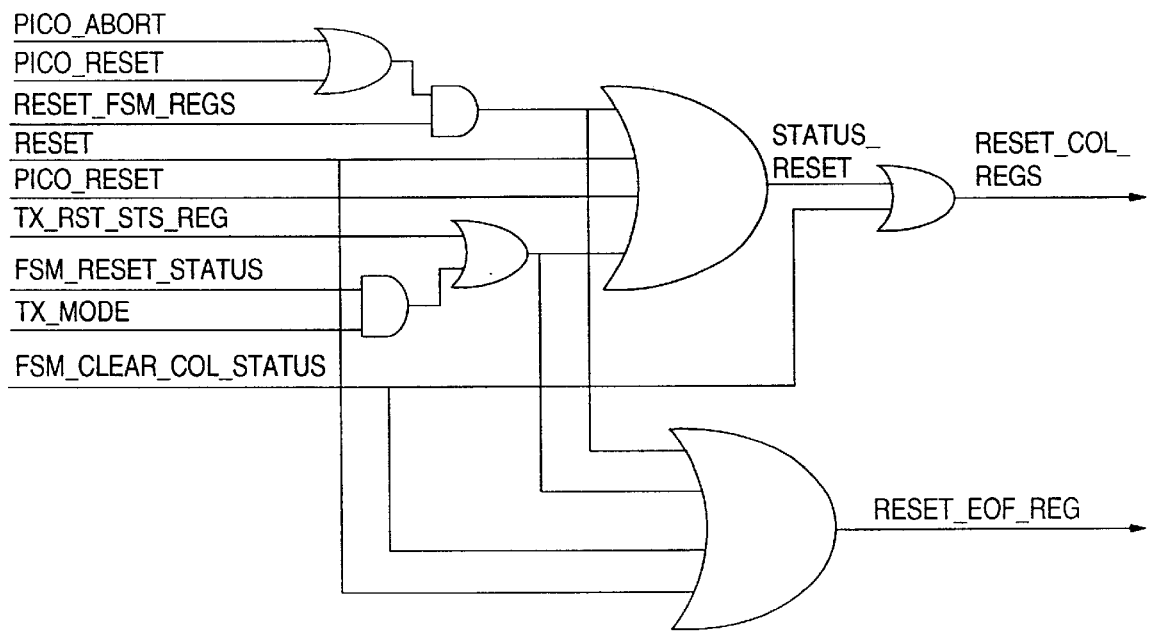
FIG. 11 shows the combinatorial logic used for generating the reset signals used by the status registers.

FIG. 11 shows the combinatorial logic used for generating the reset signals used by the status registers.

Figure 12:
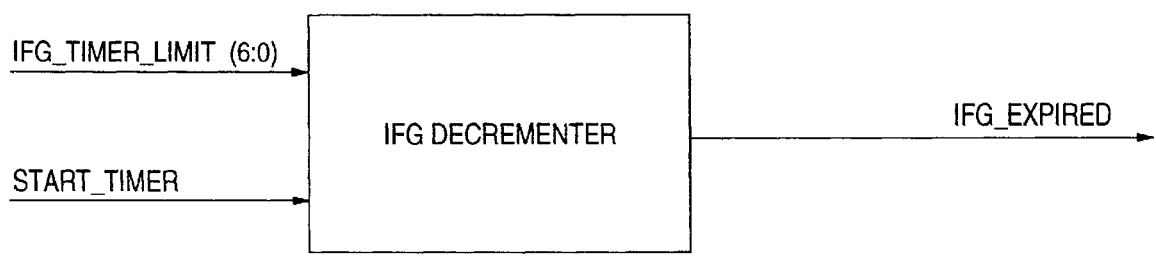
FIG. 12 shows a block diagram for the IFG Timer.

FIG. 12 shows a block diagram for the IFG timer. The IFG timer has an output labelled IFG_Expired, and two inputs; one labeled IFG_TIMER_LIMIT, and the other, START_TIMER. The IFG timer is used to add delay before the Tx State Machines begins sending the frame to EMAC for transmission. The IFG Timer is programmable, and the delay value is set by the Picocode. This IFG Timer is here to aid in performance tuning of the chip. The delay value is specified in 40 NS increments. The programmed delay value is supplied to Tx State Machine by the Tx Hardware Assist as set forth by the Picocode. The IFG Timer is essentially a 7 bit decrementer that, when activated by the FSM, will come down from the delay value set by Picocode until 0 is reached. At that time, the IFG Timer will assert a completion signal to the FSM. It 10 should be noted that since the IFG Timer is a 7 bit counter, the IFG delay can be set from 0 cycles to 127 cycles, or 0 NS to 5080 NS.

Figure 6:
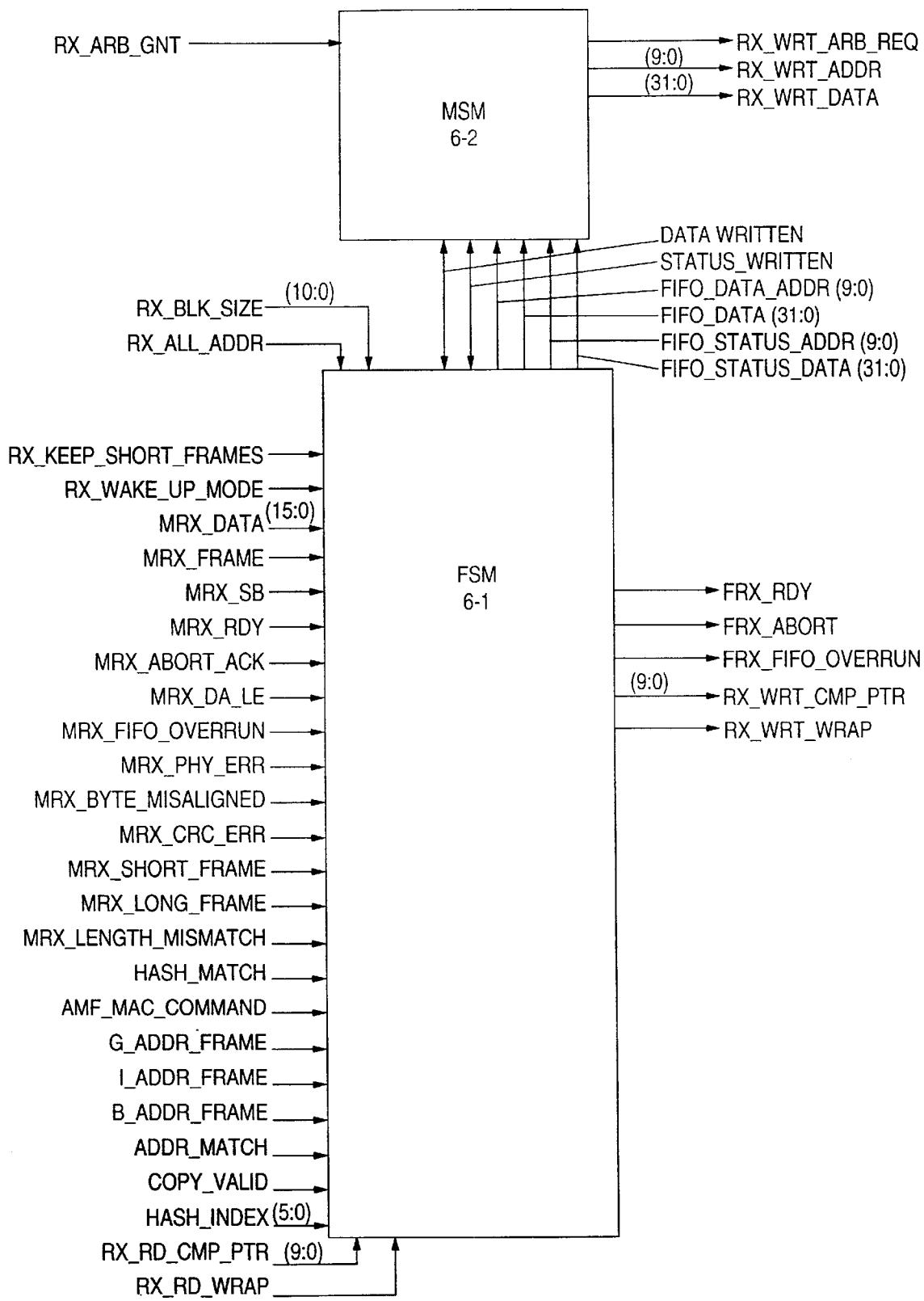
FIG. 6 shows a block diagram for the Rx (Receive) State Machine.

FIG. 6 shows a block diagram for the Rx State Machine. The Rx State Machine includes the FIFO State Machine (FSM) 6-1 and MAC State Machine (MSM) 6-2. The Rx State Machine interfaces with the Ethernet MAC logic receive portion (EMAC Rx) and transfers data from the media via an EMAC Rx to the Receive RAM 2-3 (FIG. 2). The FSM is responsible for taking accumulated data from MSM 6-2 and writing the data in the Rx RAM. MSM 6-2 is responsible for receiving the frame data and interpreting the control signals from EMAC Rx.

The interface between the Rx State Machine and EMAC Rx (Receive) control the transfer of data therebetween. The interface also controls aborting frame under ethernet error conditions and address matching. The signals in the interface are described in Table IV below. The first 13 signals in the table are inputs and the last three signals indicate output.

TABLE IV

| Names of Signals | Function |
| --- | --- |
| Inputs: | |
| MRX_DATA: | 16 bit data bus used to transfer data from EMAC Rx to the Rx RAM. |
| MRX_RDY: | Indicates EMAC has data to transfer. |
| MRX_FRAME: | Indicates that the frame is currently active. |
| MRX_SB: | Used on last transfer of a frame, to indicate that only one byte of the two bytes in MRX_DATA are valid. |
| MRX_ABORT_ACK: | EMAC Rx acknowledges a frame abort initiated by Rx State Machine. |
| MRX_DA_LE: | Indicates that the Destination Address portion of the Ethernet frame is currently being transferred on MRX_DATA. |
| MRX_FIFO_OVERRUN: | Indicates that EMAC Rx has overrun it's buffer. |
| MRX_PHY_ERR: | EMAC Rx has detected a Physical Layer error. |
| MRX_BYTE_MISALIGNED: | EMAC Rx has detected that the frame being received did not line up on a byte boundary. |
| MRX_CRC_ERR: | EMAC Rx has detected a CRC error in the data received from the media. |
| MRX_SHORT_FRAME: | The frame received from the media is shorter than the minimum allowed Ethernet frame length (64 bytes). |
| MRX_LONG_FRAME: | The frame received from the media is longer than the maximum allowed Ethernet frame length (1518 bytes). |
| MRX_LENGTH_MISMATCH: | The length of the frame received from the media does not match the length given in the Ethernet header length/type field. |
| Outputs: | |
| FRX_RDY: | Indicates that Rx State Machine can accept data from EMAC Rx. |
| FRX_ABORT: | Indicates that Rx State Machine is requesting that EMAC Rx abort the current frame. |
| FRX_FIFO_OVERRUN: | Indicates that the Rx State Machine has detected an overrun in the Rx RAM. |

Once a block of data has been written in the Rx RAM by the Rx State Machine, it informs the Picoprocessor via a status bit that a block of data is available to be moved from the Rx RAM to the host receive buffer described above. The Picoprocessor then reads the block control word for this block from the Rx RAM into the Picocode local store. This tells the Picoprocessor whether the block is for the start of frame (SOF) and/or end of frame (EOF), as well as the length of the data within the block. The control word is built by the Rx State Machine as the block is filled with data from the EMAC Rx.

Turning to FIG. 13 for the moment, the format for the Rx RAM control word is shown. Preferably, the Rx RAM could be any of the conventional type of storage devices including a FIFO storage device. The control word is a 32 bit word with bit 31 identifying the end of frame, bit 30 identifying the start of frame, bit 29 is not used, bits 28 through 16 include the Rx Desc Status Bits, bits 15 through 10 is a Hash Index, and bits 9 through 0 represent the byte count. The data is then written to host receive buffers via APCI bus master write operation.

An outline of the operation for the Rx State Machine is listed below in Table V.

TABLE V

1. Frame processing starts when EMAC RX asserts MRX_FRAME and MRX_DA_LE. When MSM sees these signals it begins frame processing. MSM then waits for MRX_RDY to be asserted to indicate that EMAC Rx is transferring data. Once two transfers have occurred, MSM will signal to FSM that a 32 bit word of data is ready to be written into the Rx RAM.
2. FSM sees the DATA_WRITTEN signal asserted when the word of data needs to be written, so it issues a write request to the Rx RAM for the word to be written. When the write is complete it de-asserts the DATA_WRITTEN signal.
3. This process continues until a block of data has been written or the frame ends, whichever occurs first. At this point, MSM checks to see if the frame has passed the Address Match Filter. If it has, MSM builds the Block Control Word and requests that FSM write it into the Rx RAM via assertion of the STATUS_WRITTEN signal.
4. FSM follows the same procedure for writing the control word as it did for data, except when the control word is written in the Rx RAM, it de-asserts the STATUS_WRITTEN signal.
5. MSM then will increment the RX_WRT_CMP_PTR, which results in the status bit being set in the Picoprocessor, telling the Picocode that a block of data is in the Rx RAM and needs to be transferred to the host buffer.

TABLE V-continued

6. If the frame does not pass the Address Match Filter, the block of data written to the Rx RAM is discarded, as is all further data passed from EMAC Rx, until the frame ends.

Still referring to FIG. 6, the mission of FSM 6-1 is to write data and control words into the Rx RAM. FSM 6-1 is not truly a state machine. It is a one state process that waits for requests from MSM 6-2 to write data or control words into the Rx RAM.

Still referring to FIG. 6, the mission of the MSM 6-2 is to interface with the EMAC Rx control signals, and accumulate a 32 bit word of data for FSM 6-1 to write into the Rx RAM. The MSM 6-2 has five states which are listed below in Table VI.

TABLE VI

0. IDLE/WRITE STATUS/CHECK FOR OVERRUNS: Waits for frame to start. If within frame processing, this state is responsible for having FSM write control words into the Rx RAM.
1. RECEIVE FIRST 2 BYTES OF DATA: This state is responsible to accumulate bits 31:16 of the 32 bit data word.
2. RECEIVE SECOND 2 BYTES OF DATA: This state is responsible to accumulate bits 15:0 of the 32 bit data word. Once the data is in the control word, MSM requests FSM to write the data into the Rx RAM.
3. WAIT FOR DATA TO BE WRITTEN TO Rx RAM: This state waits for FSM to complete the data writes.
4. FLUSH FRAME: This state flushes frame data from EMAC Rx if the frame has been aborted due to lack of an address match, or FIFO Overruns detected by MSM, or if the chip is in Wake-Up mode (discussed hereinafter).
5. FIFO OVERRUN: This is the state that handles FIFO Overruns detected by EMAC Rx.

Having described the structure of the adapter, the operation and some of the functions which the adapter provides will now be described.

Adapter Data Throughput

Ethernet frames contain a variable amount of data, ranging from 46 bytes to 1500 bytes in the frame payload. Not knowing ahead of time the actual number of bytes contained in the frame makes management of adapter resources such as the host bus, more difficult and less efficient. The Picoprocessor (2-1) is at its best in scheduling and moving data through the adapter when it can accurately predict adapter resource utilization. Information is available to tell the Picoprocessor (2-1) the length of transmit frames. The information is supplied by the Device Driver (1-2) in the transmit descriptor (3-1). The format of the Transmit descriptor (3-1) is shown in FIG. 3. However, for received frames, this information is not readily available. Unless the Picoprocessor (2-1) waits until the entire receive frame is in the Rx RAM (2-3) before transferring it to the Host Receive Data Buffer(s) (4-1) shown in FIG. 4, it will not know how long the frame is. For performance reasons, to lower the probability of receive overruns, and to minimize the size of Rx RAM (2-3) required, it is desirable to transfer data from the Rx RAM (2-3) to the Host Receive Buffer(s) (4-1) as soon as possible. The question is how much data should be in the Rx RAM (2-3) before it should get transferred to the Host Receive Buffer (4-1). Also, what mechanism should be used to divide the Picoprocessor (2-1) work between the Transmit (2-9) and Receive (2-10) channel?

According to the teachings of the present invention, the m Ethernet frames into data blocks such that the length of each block (except the last) is known. The value of this technique increases as the bit rate of the media increases and will be extremely important at gigabit speeds. The adapter has a control register known as the 'BLOCK_SIZE' register, that separately defines the sizes of Transmit Blocks and Receive Blocks. The block size register resides in the PCI Slave Registers (2-11). This block size is used to divide work in the Picoprocessor (2-1) between the Transmit (2-9) and Receive (2-10) channels. It also is used to define the transfer burst size for data movement on the PCI Bus (1-5). The transmit block size defines the maximum amount of data moved from the Host Transmit Buffer (2-3) to the Tx RAM (2-2) in one transfer. The transmit block size is valid for the first transmit block only. The size of all other transmit blocks is determined via a Secondary Transmit Block Size, set in another register. This allows further tuning of transmit performance by allowing a larger transfer for the first block and smaller transfers for subsequent blocks. The receive block size defines the maximum amount of data to transfer between the Rx RAM (2-3) and the Host Receive Buffer(s) in one transfer. Once the Picoprocessor (2-1) has transferred a block of Tx data, it then will transfer a block of Rx data, and so on, switching between the Tx and Rx channels on a block-by-block basis. This scheme allows the PCI transfer size and handling of Tx and Rx channels to be tuned for maximum efficiency.

Data Overlap Using Blocks

From a performance perspective it is required to overlap the data movement between the adapter and ethernet with the transfer of the data between the host memory and the adapter. Without this overlap the adapter would operate in a store and forward manner with a significant reduction in frame throughput. When overlapping the data movement at bit rates of 100 Mbps and higher, transmit underruns become a significant problem. Each time a transmit underrun occurs, the prior art aborts the transmit operation, clears the Tx RAM (2-2) and, when instructed by the software, retransmits the frame. This process is time consuming and will occur more often as the media speeds increase into the gigabit per second range. The architecture, according to the present invention, allows the adapter to begin transmitting data on the media at many points during a frame by using the previously mentioned block architecture. At the end of each block transfer of Tx data from the Transmit Host Buffer (2-3) to the Tx RAM (2-2), the Picoprocessor (2-1) can initiate transmission on the media by signalling to the Tx State Machine (2-4) (TSM) Transmit Logic to begin transmitting. The TSM (2-4) would then begin extracting data from the Tx RAM (2-2) and transferring it to the EMAC Tx (2-9), where it would then be transferred across the MII bus (1-8) to the Physical Layer (1-9) and then to the media itself (1-10). This scheme gives flexibility to begin transmitting when it is most advantageous, and to delay transmission if PCI Bus (1-5) transfers are degraded to the point that transmit underruns may occur.

Multiple Blocks Before Starting Transmit

Once the adapter starts to transmit frame data onto the media, it must continue to provide data to media consistent with the media bit rate, or a transmit underrun occurs. With transmit underruns occurring, the performance of the adapter is reduced. Failure to maintain enough data in the Tx RAM (2-2) to prevent transmit underruns can be avoided by moving more data into the Tx RAM (2-2) before starting the transfer of data to the media. This invention architects a method wherein the adapter hardware/Picoprocessor (2-1) and the host device driver (1-2) code adjusts the number of data bytes in the Tx RAM (2-2) such that the number to transmit underruns is minimized. This amount of data is communicated to the adapter by a threshold value programmed into the Transmit Host Descriptor Parameter/Status (3-3) field by the device driver (1-2). The value is set to the number of blocks that the Picoprocessor (2-1) should transfer from the Host Buffers (3-2) to the Tx RAM (2-2) before starting transmission. This value is known as the Tx Threshold. The device driver (1-2) may set this threshold to whatever value it sees fit, and it can be adjusted if a significant number of underruns occur.

Multiple Queued Frames in the Tx Direction

To increase performance, the teachings of the present invention allows multiple transmit frames to be queued for transmission via a single host command, thus improving the system performance by reducing the device driver (1-2) overhead required to initiate a transmit operation. This reduction is necessary to maintain a high throughput on a 100 megabit or gigabit ethernet link. This multiple queuing is done via a frame count register (3-4, 3-5) in the adapter. When the device driver (1-2) wants to queue up one or more frames to transmit, it writes this number of frames to the frame count register (3-4, 3-5). In the adapter, this value written by the device driver (1-2) is added to the value currently in the register, reflecting the total number of frames currently enqueued by the device driver (1-2). When the adapter completes transmission of the frame, it decrements the frame count by one. Once the frame count reaches zero, the adapter knows that no more frames are enqueued.

In addition to queuing multiple frames for transmission, the architecture of the present invention includes a Phantom Buffer (2-12) located on the host bus interface that not only matches the speed difference between the host bus and the adapters internal clocks, but allows larger blocks of data to be passed across the host bus than can fit into the Phantom Buffer (2-12). This makes data transfer across the PCI Bus (1-5) more efficient and improves the adapter's throughput, and provides a clean speed matching boundary between the PCI Clock domain and the internal clock domain of the adapter.

Control Word Per Data Block

The Tx RAM (2-2) is loaded with data blocks with a control word located at the beginning of each block. Using this block approach, the adapter TSM (2-4) can control the transmit data on a block basis. The TSM (2-4) knows at the beginning of the block transfer if the data contained in the block is the beginning of the frame, the end of the frame, or belongs somewhere in the middle of the frame. While the data is being moved to the media, the Picoprocessor (2-1) controlling the data moves can calculate the next operation to preform. Because these calculations occur while the frame is being transmitted, the adapter performance is increased.

In the receive direction, for data moving from the network to the host, the receive state machine (2-13) (RSM) splits the received frames into blocks and appends to each block a control word that is generated by the RSM (2-13). The adapter Picoprocessor (2-1) uses these control words to initiate DMA operations to move the data from the Rx RAM (2-3) into the Host Receive Data buffers (4-1). The control word contains bits to tell the Picoprocessor (2-1) where the frame begins and ends, and also gives it status for the frame. The status indicates if any errors occurred during receipt of the frame and also address match information. By knowing the block size, the Picoprocessor (2-1) can schedule the data movement such that transmit and receive data blocks can be multiplexed on the PCI Bus (1-5) in the most efficient and in a predetermined manner.

Programmable Interframe Gap Timer

The IEEE 802.3 Ethernet standards require that there be a gap between frames where no activity is present on the media. The minimum duration of this interframe gap is defined to be 96 bit times. At 100 Mbps, this time is equivalent to 960 ns. As the media bit rate increases and the speed of the attached adapters increase it is more likely that the multiple adapters will be ready to transmit at the end of the interfame gap. When multiple adapters attempt to transmit at the same time, a collision occurs on the ether (ethernet media). These collisions require (IEEE 802.3) that the adapters stop transmitting and wait some amount of time before attempting a retransmission. This waiting reduces the throughput of the network.

The architecture of the present invention defines a Programmable Interframe Gap Timer that increases the interframe gap beyond the 96 bit minimum required by the IEEE standards. The additional interframe gap time reduces the number of collisions on the media. This increases performance because the additional delay introduced by the Interframe Gap Timer is much less than the delay introduced by the prior art back-off technique after a collision. The net is that with the Programmable Interframe Gap Timer, the network performance is increased beyond what would otherwise be possible. Based on an architected algorithm, the device driver (1-2) and the Picoprocessor (2-1) can modify the Interframe Gap timer during operation of the adapter. The Interframe Gap timer increases the Interframe Gap by delaying transfer of data between the TSM (2-4) and the EMAC Tx (2-9). Once a frame is complete, the value of the Interframe Gap Timer is read, and a timer (described above) in TSM (2-4) decrements with each internal clock cycle until the timer expires. Then transfer of data begins. The Interframe Gap timer is passed from the device driver (1-2) to the Picoprocessor (2-1). The Picoprocessor (2-1) then sets this value in the TSM (2-4) and it is used between each frame.

Priority Queues on Transmit

The Ethernet adapter architecture described in this disclosure includes two transmit queues. The two queues are shown in FIG. 3 and discussed above. These queues are used to transmit frames of different priorities, a High Priority Queue (3-6) and a Low Priority Queue (3-7). Most frames are attached to the Low Priority Queue by the device driver (1-2). After the adapter transmits a frame from the Low Priority Queue (3-7), it checks to see if a frame is attached to the High Priority Queue (3-6). If a frame is attached to the High Priority Queue (3-6), it will be the frame transmitted next. Otherwise, the adapter will transmit the next frame attached to the Low Priority Queue (3-7). This double transmit queue does not exist in the current ethernet adapter art. It is required and is a major requirement if the adapter implements the IEEE 802.3X standards (Flow Control). When implementing Flow Control, the MAC Pause commands are sent via the High Priority Queue (3-6) because traffic on the Low Priority Queue (3-7) may be stopped. Without the two queues, Flow Control cannot be implemented.

Advanced Configuration and Power Interface (ACPI)

A new requirement of Ethernet adapters is having capability to do ACPI, which is referred to as Power Management or PC98. Implementing Power Management consists of two main parts. The first part is implementing the architected PCI Power Management registers generating Power Management Events (PME#) on the PCI Bus (1-5), and reducing power consumption during lower power states. The second is to detect a Network Wake-Up event.

In the first case, the Ethernet adapter architecture has full PCI Power Management support, with support for states D0, D1, D2, D3hot and D3cold (when using an auxiliary power supply). To preserve power when not in state D0, the Ethernet adapter disables the Picoprocessor (2-1), reducing power consumption by 25%.

In the second case, the Ethernet adapter has the capability to do an exact match on 8 different 128 byte data patterns. The device driver (1-2) programs the data patterns and compare masks into the adapter and enables Network Wake-Up mode. Then, for frames that pass the Address Match function (2-6) filter, the Ethernet adapter (1-6) will compare the data received with each of the 8, 128 byte patterns, and will generate a Power Management Event when a match is made.

Flow Control

The IEEE 802.3X describes the Ethernet Flow Control process. The Ethernet adapter architecture described in this invention includes an implementation of the Flow Control standard. The architecture utilizes the adapter's Address Match Function (2-6), used to match the Destination Address of the received Ethernet Frame with various internal Address registers, to also match the Ethernet Frame's Special Multicast Address or the Adapters Unicast Address to determine if the received frame is a MAC frame. If the received frame's address matches either the special Multicast or the adapters unicast address, the two bytes following the frames Source address is checked. If this field indicates that the frame is a MAC frame, the first two bytes of the payload are checked for a MAC Pause command. If the frame contains a MAC Pause command, the adapter will stop transmitting after the current frame transmission completes for the period of time indicated in the frame. The time period is contained in the frame payload field bytes three and four.

The time period is in units of 512 bit times. When Pause time period elapses, the adapter will again start to transmit to the media using the Low Priority queue (3-7). During the time the Pause Command is in effect, the adapter will continue to transmit from the High Priority Queue (3-6). This is necessary to allow MAC commands to be transmitted from the adapter while the Pause is in effect.

Wake-On-LAN

The architecture described in this disclosure supports the Wakeon-LAN function. This function requires that the adapter search the payload of the received frames looking for a 32 bit preamble followed by the adapter's unicast address repeated 16 times. The preamble is 32 one bits. This sequence, preamble and addresses, can occur on any byte boundary within the payload.

The architecture utilizes the Address Match Function (2-6) logic to implement Wake-on-LAN. Detection of the preamble is done in the EMAC Rx (2-10) and the address match is performed by the same state machine that controls Destination Address match determination for received frames. If the Address within the Wake-up segment in the Wake-on-LAN frame matches the Unicast address assigned to the adapter and appears 16 times in the frame, a Wake-on-LAN signal is sent to the host. If enabled, an interrupt is also sent to the host.

Debug Interface Muxed with PROM ADDRESS

The architecture, according to the teachings of the present invention, provides a window into the chip that allows the internal chip functions to monitored via chip I/O pins. The various logical functions within the chip Picoprocessor 2-1 instruction address, state machine states, etc.) can be gated out of the chip where they can be viewed during chip debug. The Debug Interface shares it's I/O pins with the BIOS PROM (2-7) address pins, hence it does not add to the chip pin count. This architectural feature has proven valuable. The logical function to be presented on the debug bus is set via the Debug Select Register which is in the PCI Slave Registers (2-11). The value set in the register acts as a select on a multiplexer which gates the debug bus for the selected logical portion of the chip on to the debug bus. For all selections, one pin is a clock which enables the bus to be viewed on a logic analyzer. This leaves 13 pins available for viewing signals on the debug bus.

Prefetch Buffer Descriptor for Receive Operations

When receiving frames from the network the architecture described in this invention splits the frame into data blocks. Preferably, the number of data bytes in each block is defined when the adapter is initialized. The receive hardware places a Control Word in the Rx RAM (2-3) with the frame data. The Control Word is located at the beginning of the data block. This Control Word contains status information regarding the contents of the associated data block. This information contains such things as Byte Count of the block, Start-of-Frame, and End-of-Frame. The adapters Picoprocessor (2-1) uses the contents of the Control Word to initiate the movement of the frame data block into the receive host memory buffers (41) The structure of the receive descriptors and buffers is shown in FIG. 4. To improve the adapter performance, which is important at 100 and 1000 Mbps media bit rate, the adapter prefetches the first host buffer descriptor (4-2). Prefetching allows the Picoprocessor (2-1) to begin transferring data to the host buffer as soon as the receive block is full. It does not have to fetch a descriptor from the host first. This descriptor (4-2) contains the host buffer starting address and size. Once the receive host buffer (4-1) is full of received data, the adapter chains to the next free buffer.

Hardware Assists for Building Addresses

The architecture described in this invention defines hardware assist logic that extends the instruction set of the Picoprocessor (2-1). The structure of the Picoprocessor is shown in FIG. 5. These extensions reduce the code path lengths in the Picocode and hence increase the performance of the adapter. The hardware assists provide ALU (5-1) functions, PCI Bus Master interface control (5-2, 5-3), Internal data movement (5-4) between the local store (5-5) and the Tx and Rx RAMs, and the host buffer and frame descriptor address and byte count generation (5-2, 5-3). These hardware functions can run in parallel and are started at various points in the transmit and receive processes by the Picoprocessor (2-1). When the Picoprocessor (2-1) requires the results of the hardware assists, then it will check the hardware assists status to see if the results are valid. Assuming the hardware assists has not completed its task, the Picoprocessor (2-1) will wait.

Picocode IPL from EEPROM

An additional measure of flexibility is introduced by having the capability of loading the Picocode from the EEPROM (5-6). After the PCI configuration data is read from the EEPROM (5-6), the Picocode is read and written to the Picocode RAM (5-7). If the Device Driver (1-2) needs to overwrite the Picocode that was read from the EEPROM (5-6), it may write Picocode directly to the Picocode RAM (5-7) via the PCI Bus (1-5) via the PCI Slave.

We claim:

1. A method for controlling information flow within a communications network comprising the steps of:

receiving in a NIC information to be transmitted onto the network from a first Queue and information from a second Queue;

monitoring the communication network with an Address Match function to determine receipt of a MAC Pause Command;

completing transmissions already in progress at a time when said MAC Pause Command was received;

stop transmitting information from one of the queues for a time period set forth in said MAC Pause Command; and resuming transmission from the Queue where transmission was interrupted as a result of the MAC Pause Command at the end of the Pause period.

2. The method of claim 1 wherein the first Queue includes a high priority Queue and the second Queue includes a low priority Queue.

3. The method of claim 2 wherein transmission is suspended from the low priority Queue during the pause period.

4. The method of claim 2 wherein transmission is permitted from the high priority Queue during the pause period.

5. A method for controlling information flow within a communications network comprising the steps of:

receiving in a NIC information to be transmitted onto the network from a first Queue and information from a second Queue:

monitoring the communication network with an Address Match function to determine receipt of a MAC Pause Command;

stop transmitting information from one of the queues for a time period set forth in said MAC Pause Command; and resuming transmission from the Queue whereat transmission was interrupted as a result of the MAC Pause Command at the end of the Pause period.

6. The method of claim 5 further including the step of selectively transmitting predetermined information from another one of the queues during the time period set forth in said MAC Pause Command.

7. The method of claim 6 wherein the predetermined information includes control frames.

* * * * *